Figure 1:
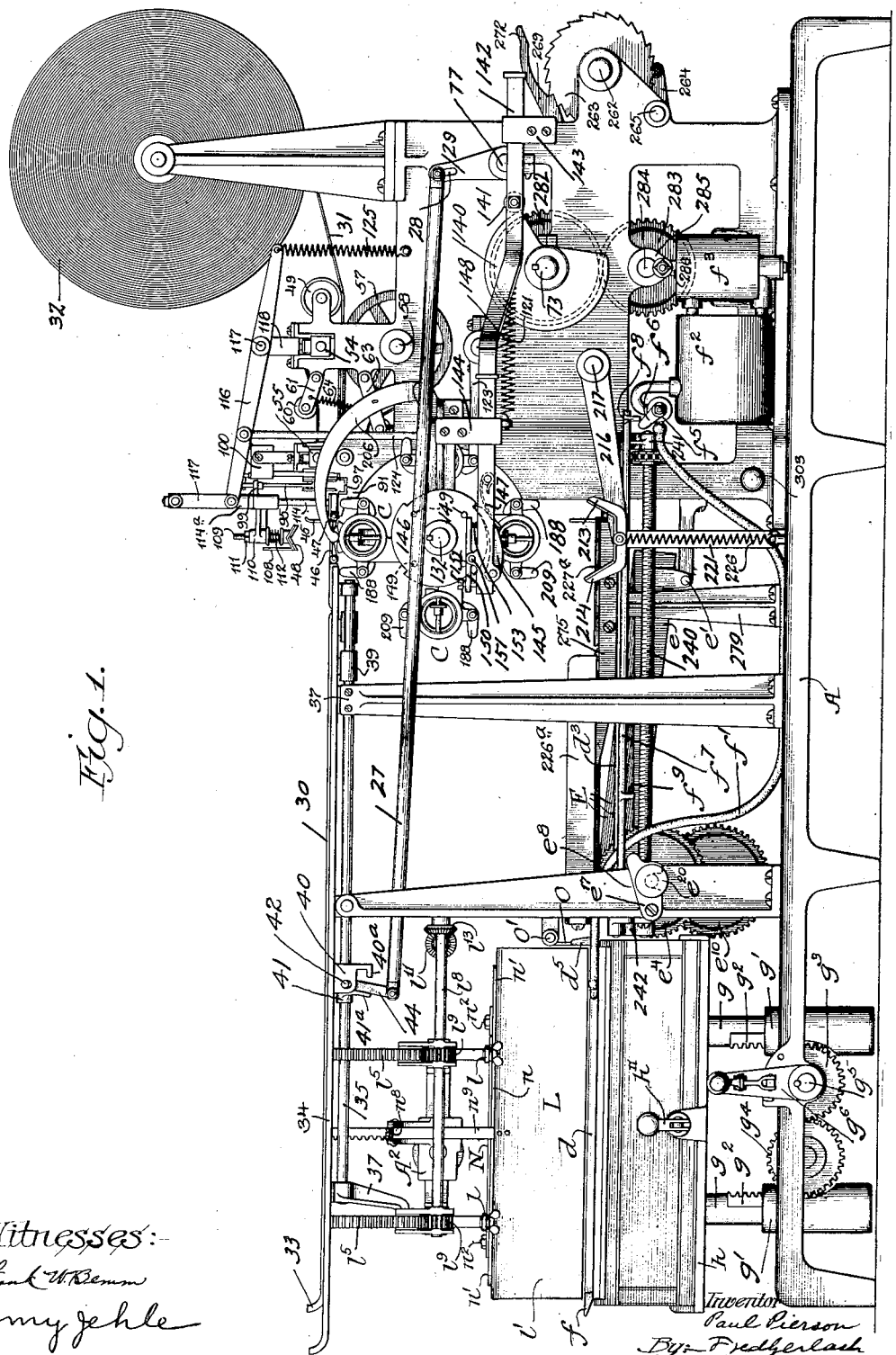

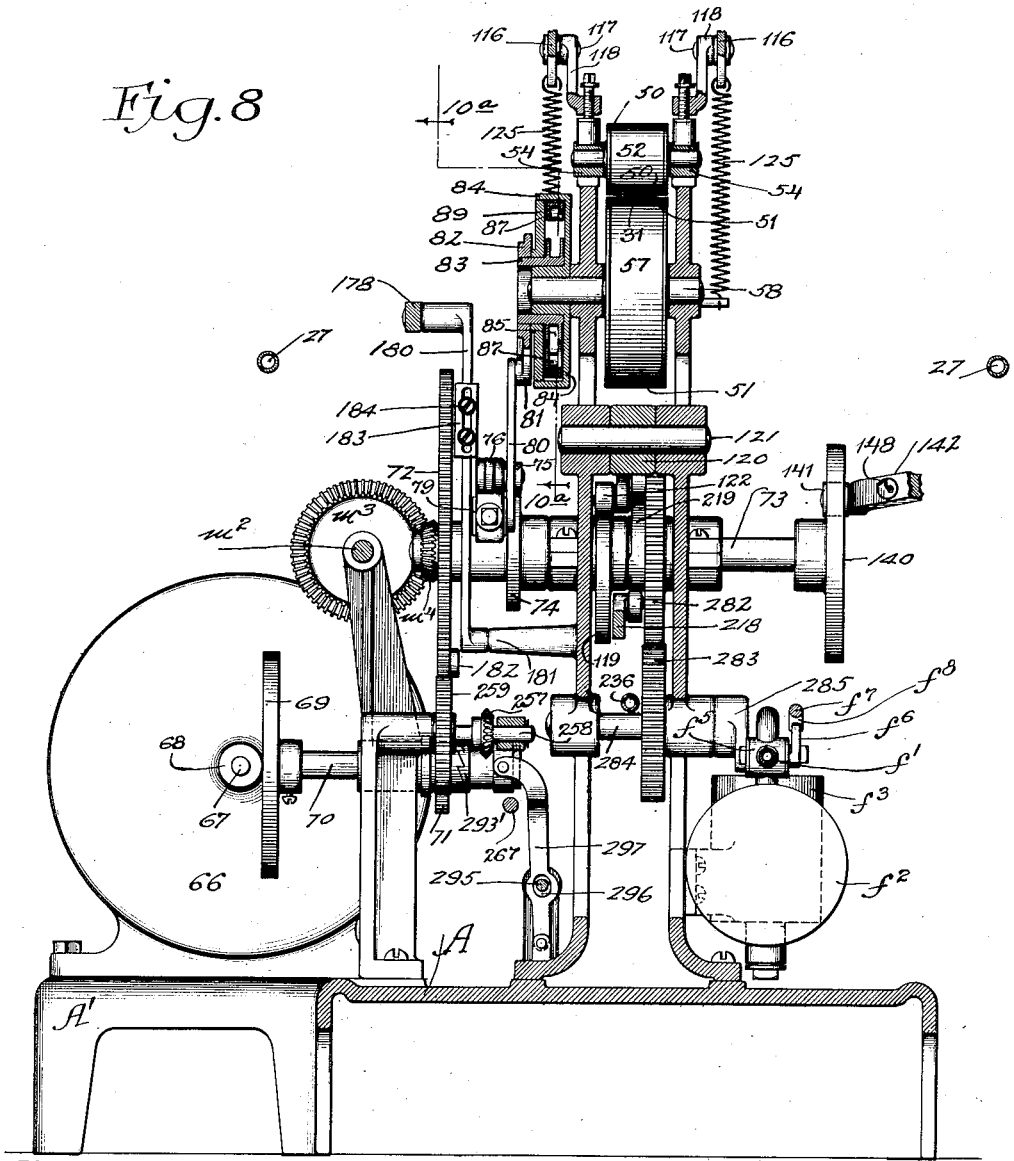

P. PIERSON.
MACHINE FOR APPLYING BANDS TO CIGARS.
APPLICATION FILED MAY 20, 1912.
1,132,209.
Patented Mar. 16, 1915.
18 SHEETS—SHEET 9.
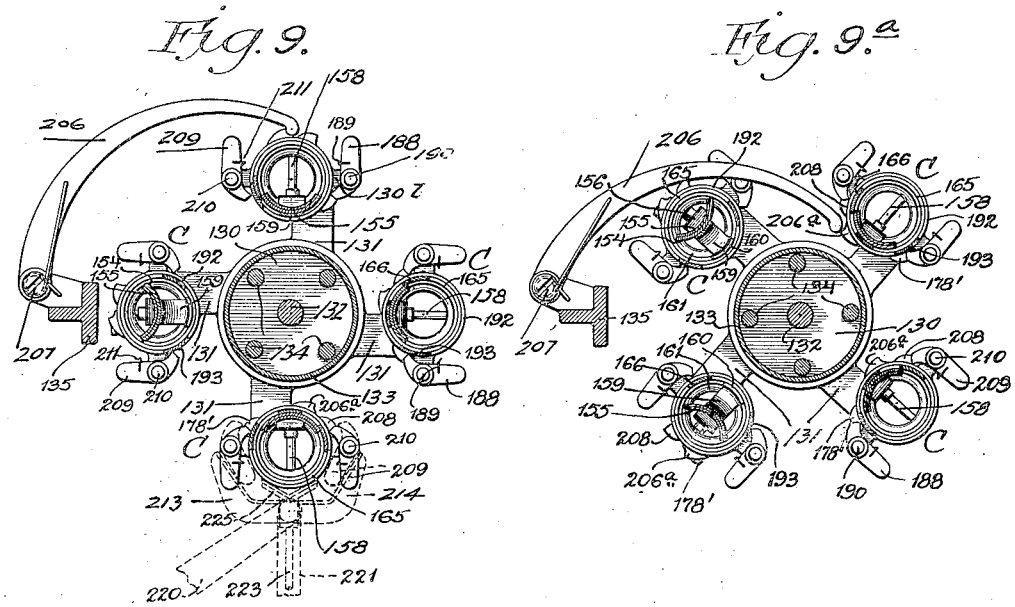
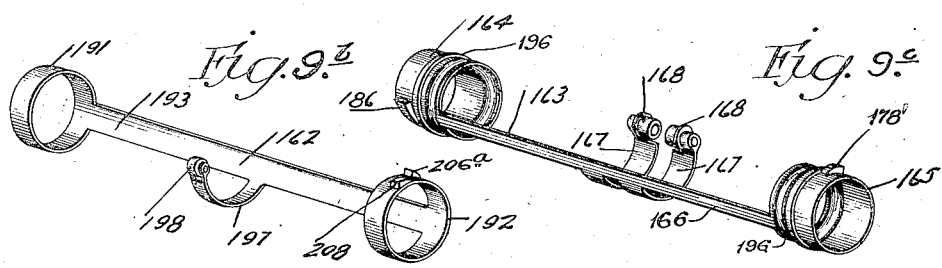
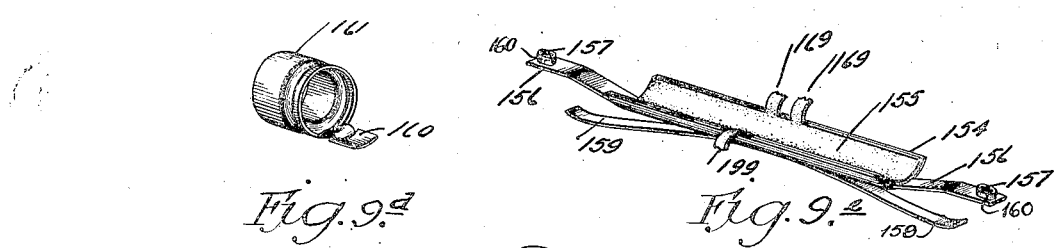
Witnesses:—
Inventor:—
Paul Pierson P. PIERSON.
MACHINE FOR APPLYING BANDS TO CIGARS.
APPLICATION FILED MAY 20, 1912.
1,132,209.
Patented Mar. 16, 1915.
18 SHEETS—SHEET 10.
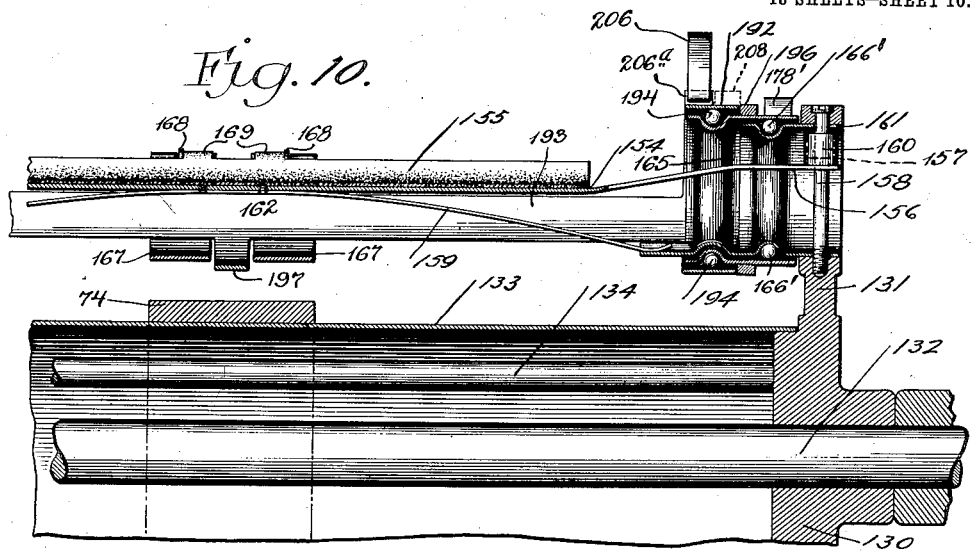
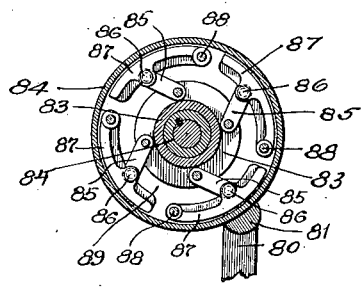
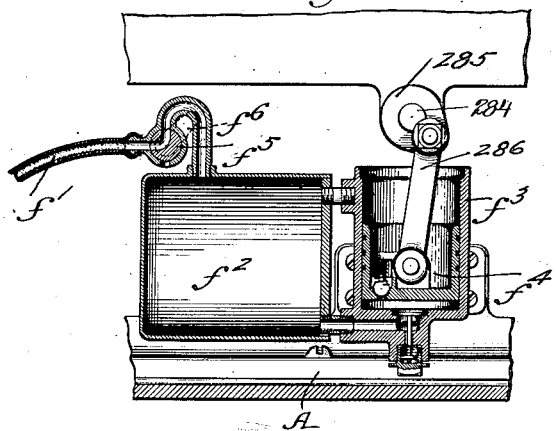
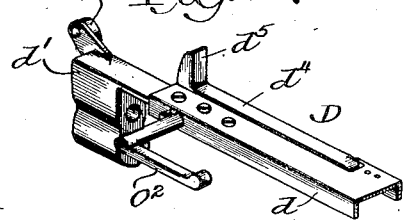
Witnesses:—
Frank W. Bemur
Amy Johle
Inventor:
Paul Pierson
By: F. W. Gerlach
his Atty.

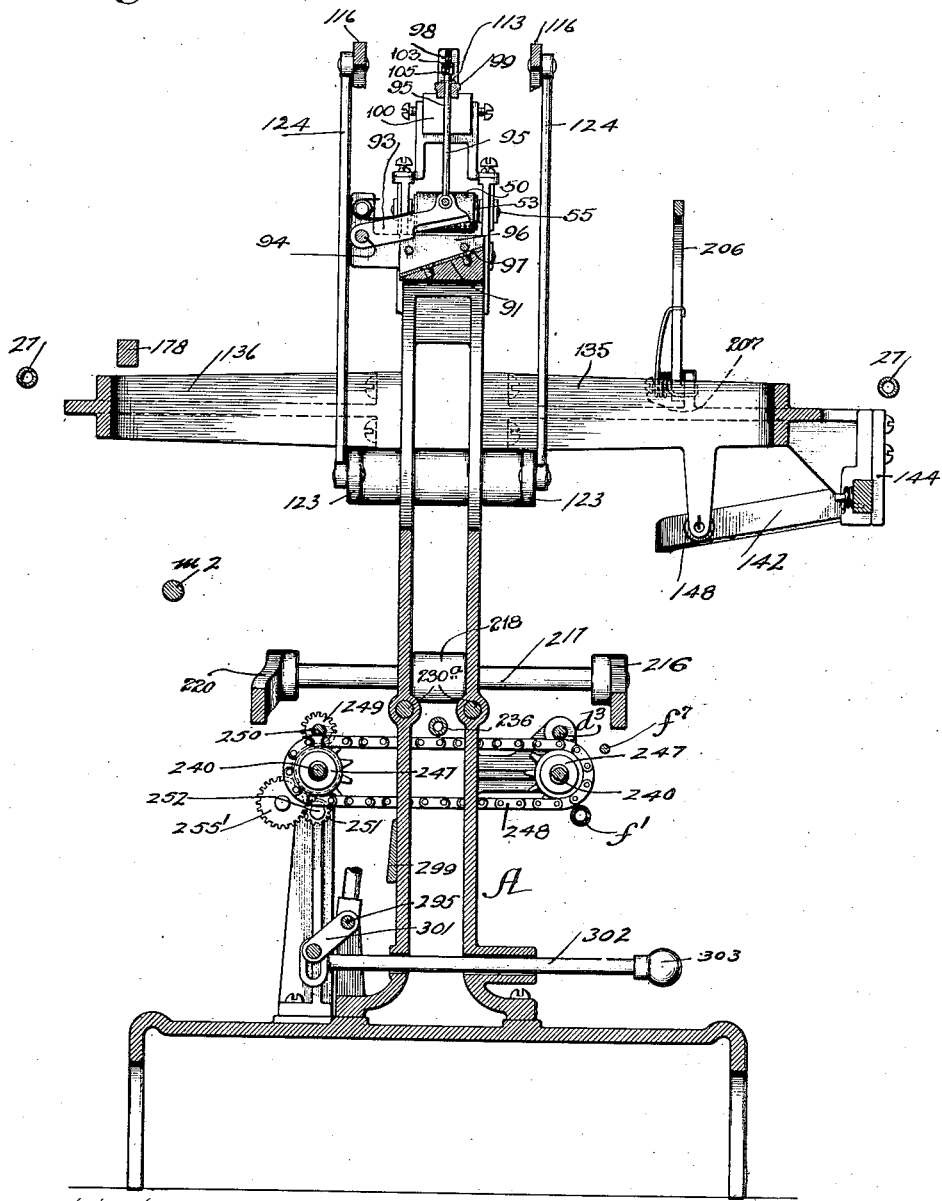

P. PIERSON.
MACHINE FOR APPLYING BANDS TO CIGARS.
APPLICATION FILED MAY 20, 1912.
1,132,209.
Patented Mar. 16, 1915.
18 SHEETS—SHEET 12.
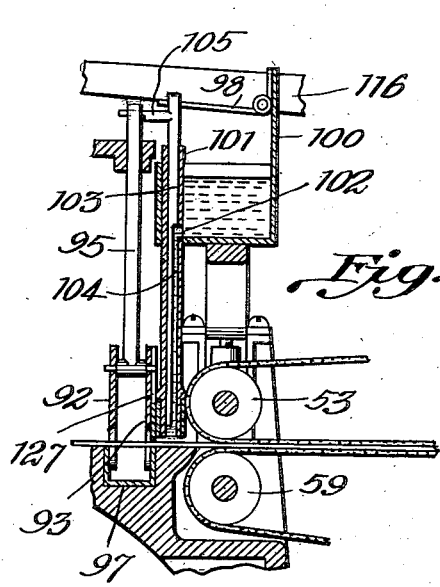
Fig. 19.
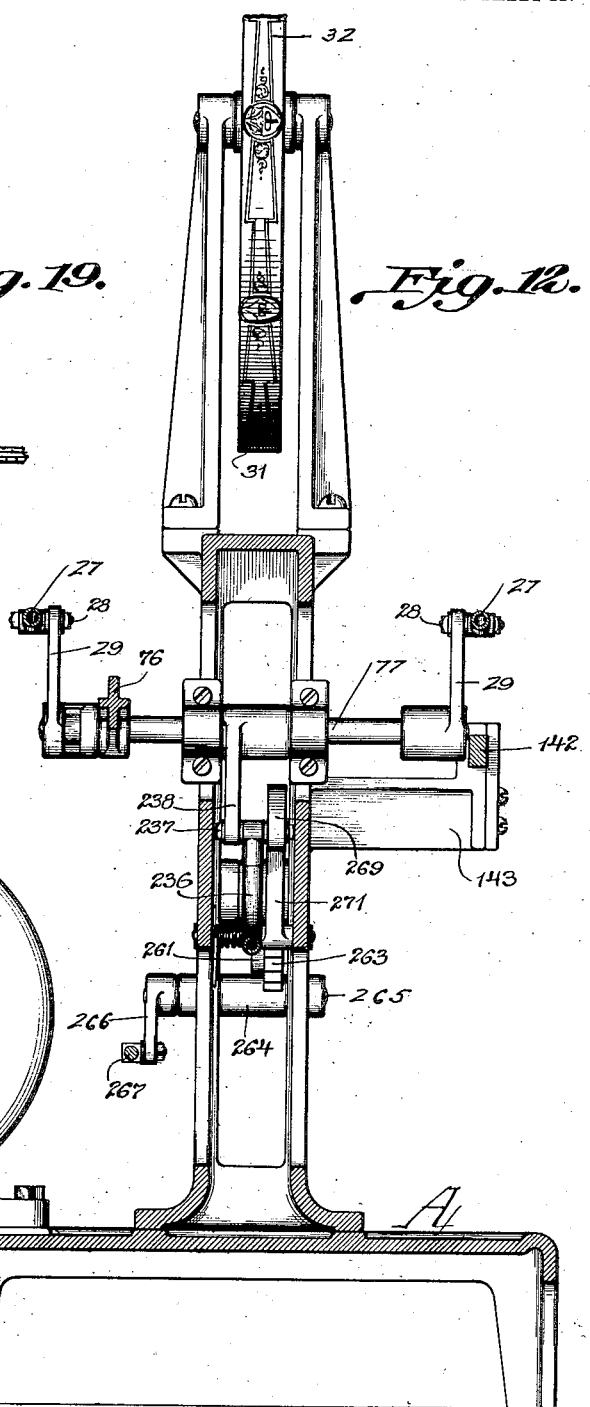
Fig. 12.
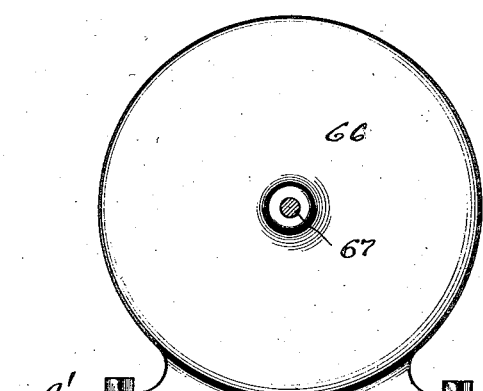
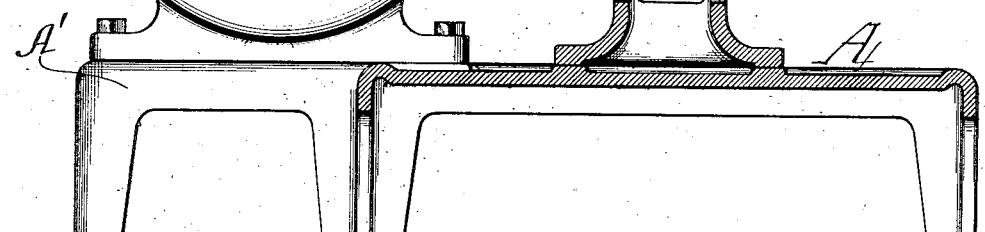

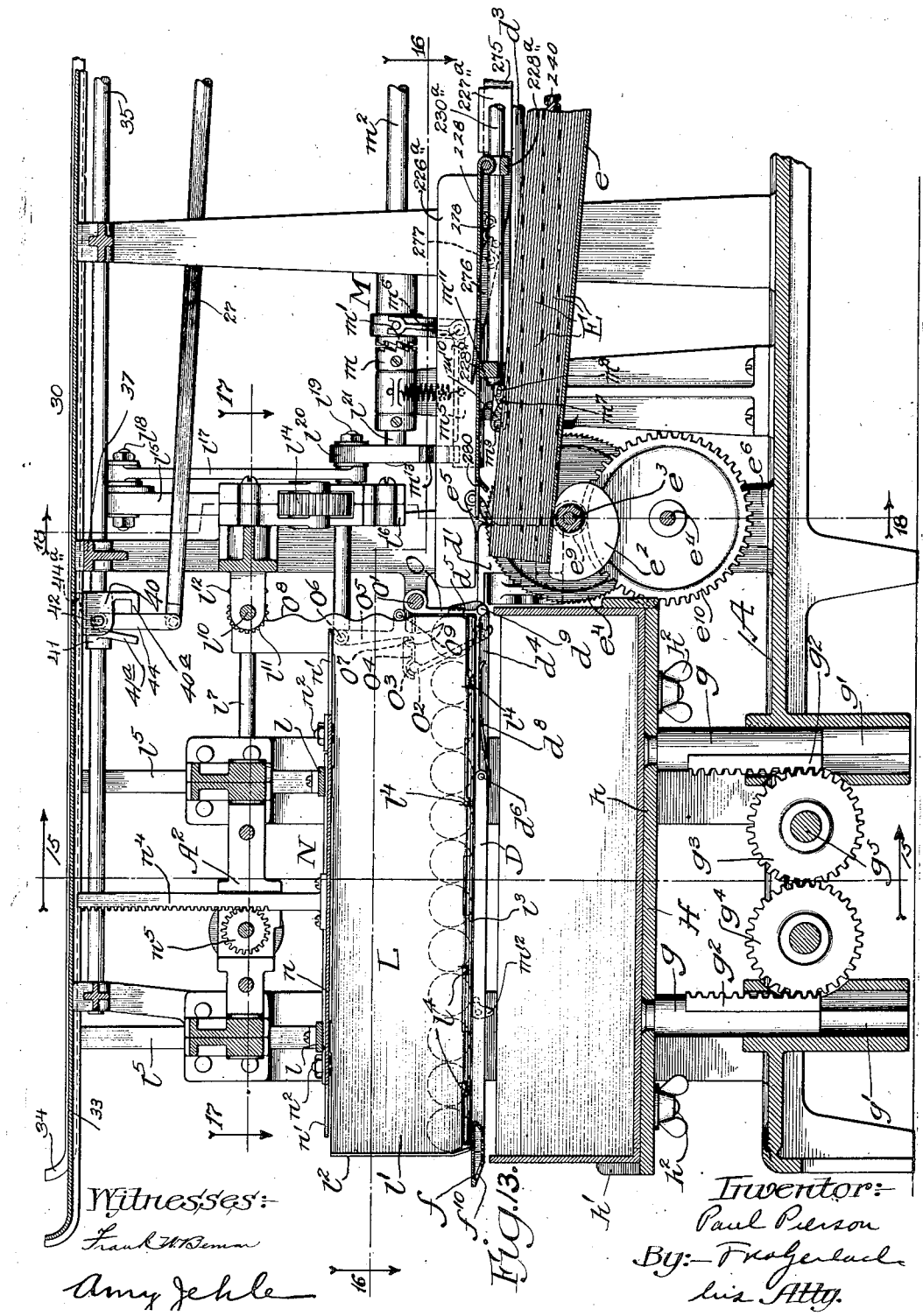

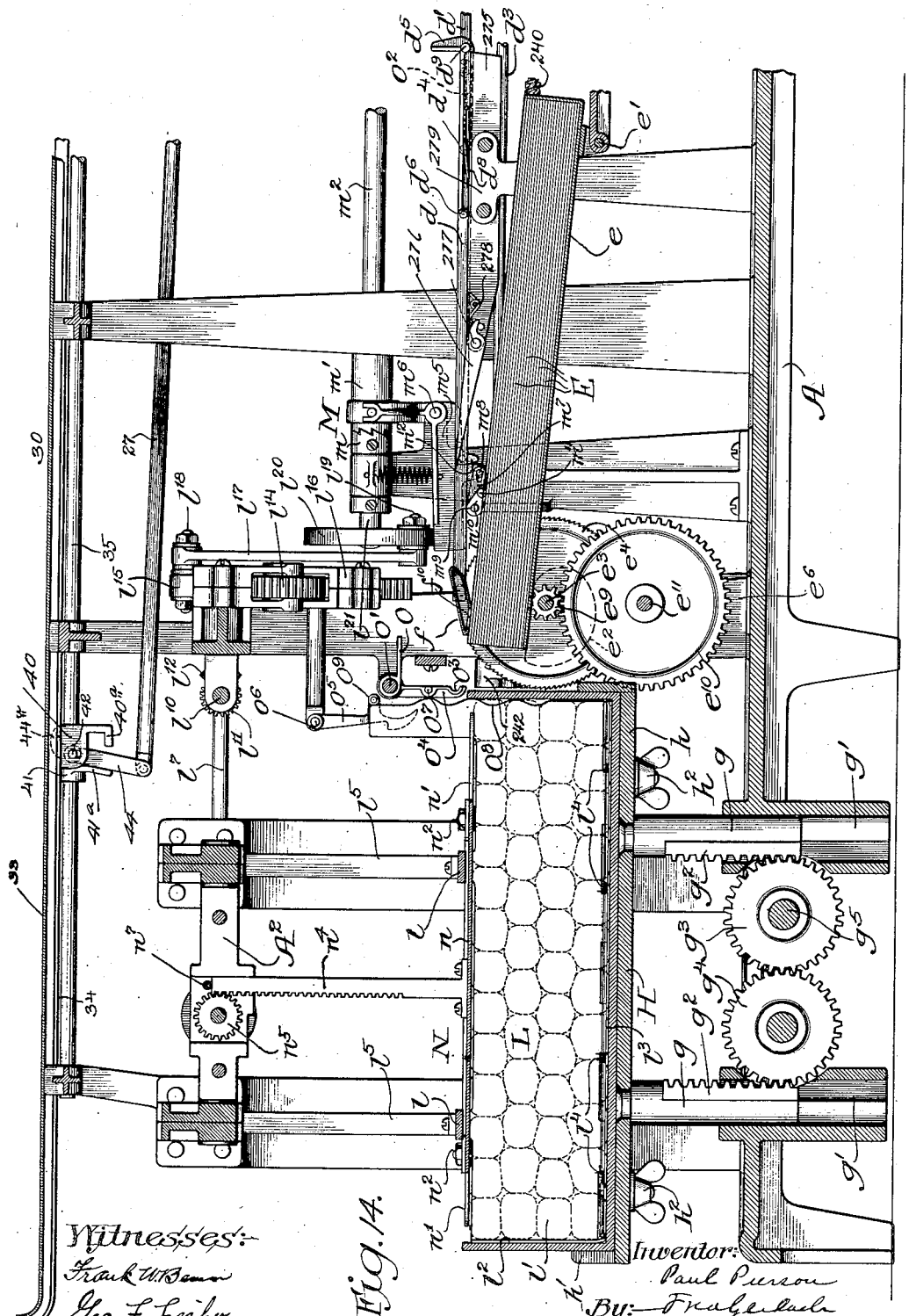

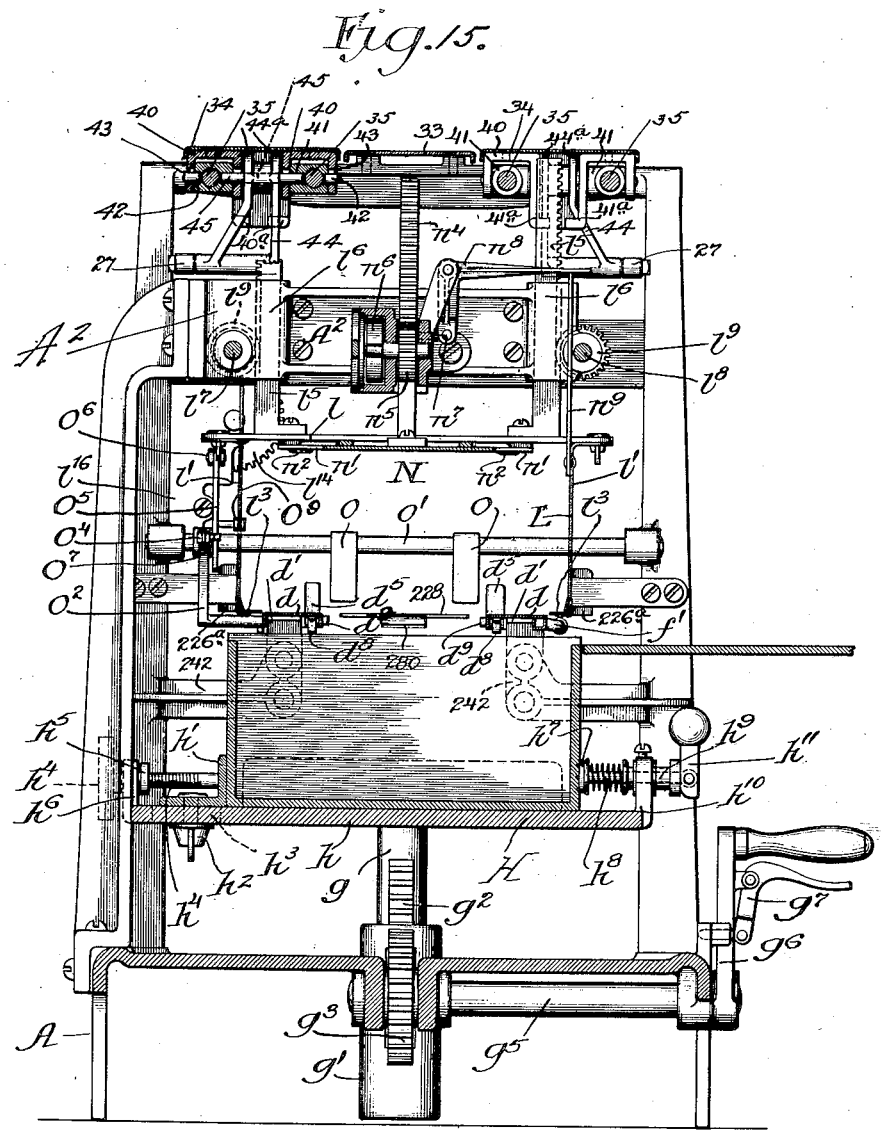

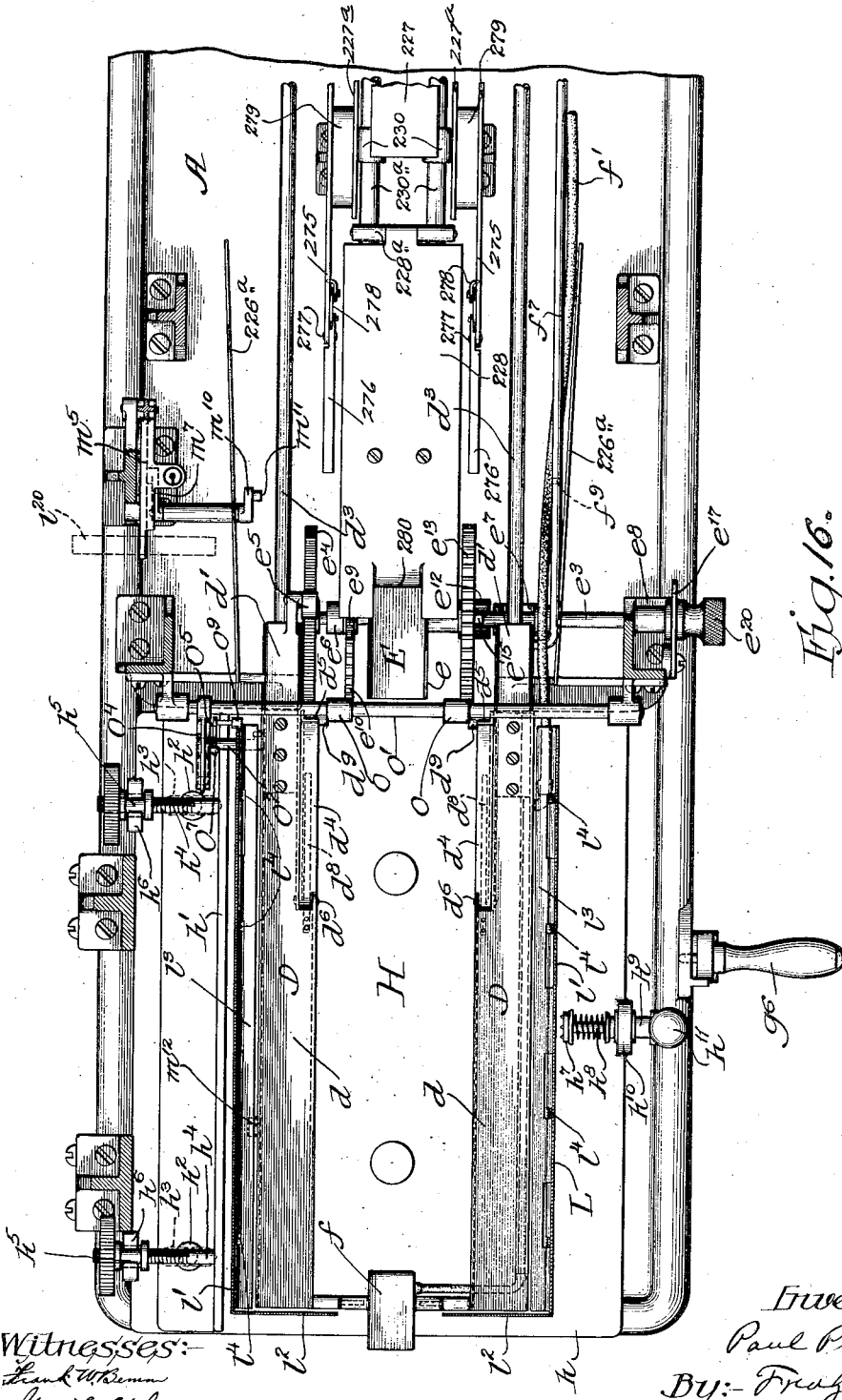

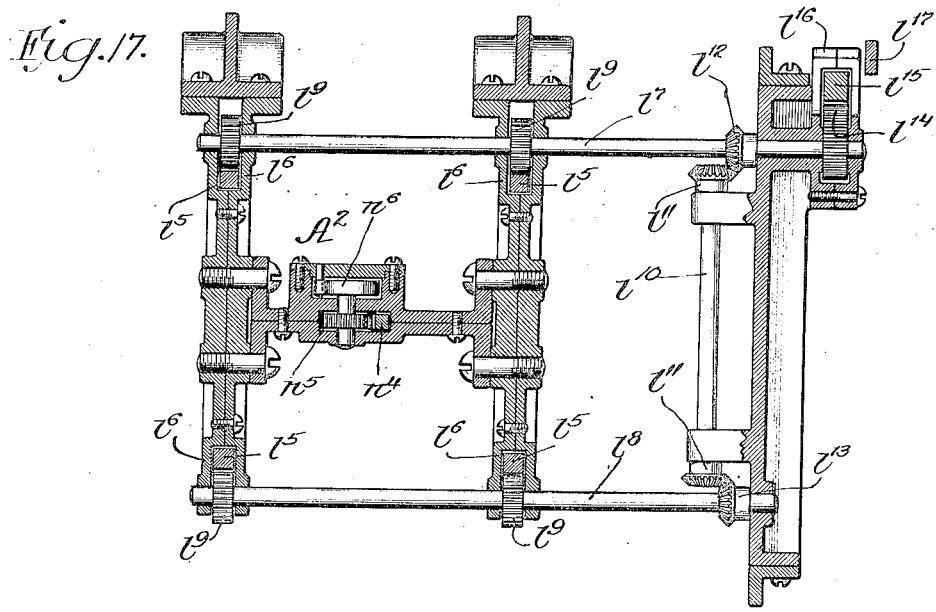
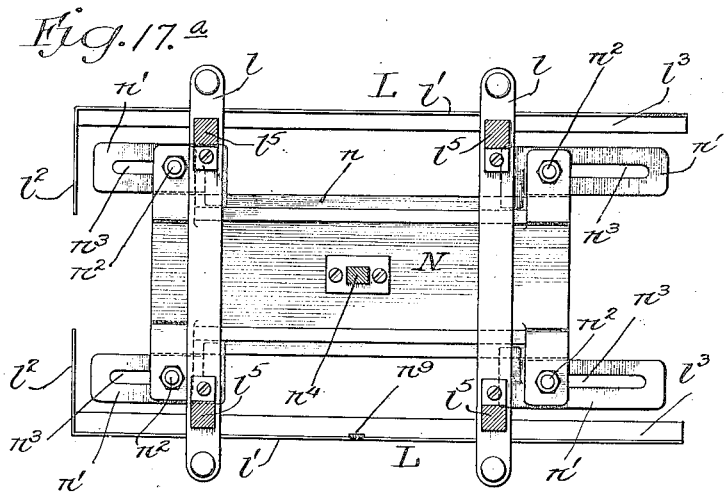

P. PIERSON.
MACHINE FOR APPLYING BANDS TO CIGARS.
APPLICATION FILED MAY 20, 1912.

1,132,209.

Patented Mar. 16, 1915.
18 SHEETS—SHEET 18.

Witnesses:
Frank W. Bemm
Geo. F. Fisher

Inventor:
Paul Pierson
By:— Fred Gerlach
his Atty.

UNITED STATES PATENT OFFICE.

PAUL PIERSON, OF CHICAGO, ILLINOIS.

MACHINE FOR APPLYING BANDS TO CIGARS.

1,132,209.  Specification of Letters Patent.  Patented Mar. 16, 1915.

Application filed May 20, 1912. Serial No. 698,597.

*To all whom it may concern:*

Be it known that I, PAUL PIERSON, a resident of Chicago, in the county of Cook and State of Illinois, have invented certain new and useful Improvements in Machines for Applying Bands to Cigars, of which the following is a full, clear, and exact description.

The invention relates to machines for banding cigars.

One object of the invention is to provide an improved banding device whereby both the underlying and overlying ends of the band, after it has been placed around the cigar, will be snugly held around the cigar and which is particularly adapted for bands having one end wider than the other.

A further object of the invention is to provide a simple device for snugly wrapping bands around cigars, and which is particularly adapted to wrap cigars of irregular shape and different sizes.

A further object of the invention is to provide an improved banding device comprising flexible tapes, in which the cigar is held upon a support, and which is operable in such manner that a cigar will not roll in or on the tapes and so that the relative position between the cigars of a row will not be disturbed.

A still further object of the invention is to provide an improved cigar banding machine comprising mechanism for packing the cigars in boxes and in which the cigars are fed through the machine in such manner that their relative position will not be disturbed, and so that when previously boxed cigars are supplied to the banding mechanism, in the same order as they occupied in the box, they will be packed in rows composed of the same cigars as the original rows.

A further object of the invention is to provide an improved row-feeding mechanism for banded cigars and whereby alternate rows of different numbers will be fed to the packing mechanism.

Further objects of the invention will be obvious from the description of the invention as hereinafter set forth.

The invention consists in the several novel features hereinafter set forth, and more particularly defined by claims at the conclusion hereof.

Figure 2:
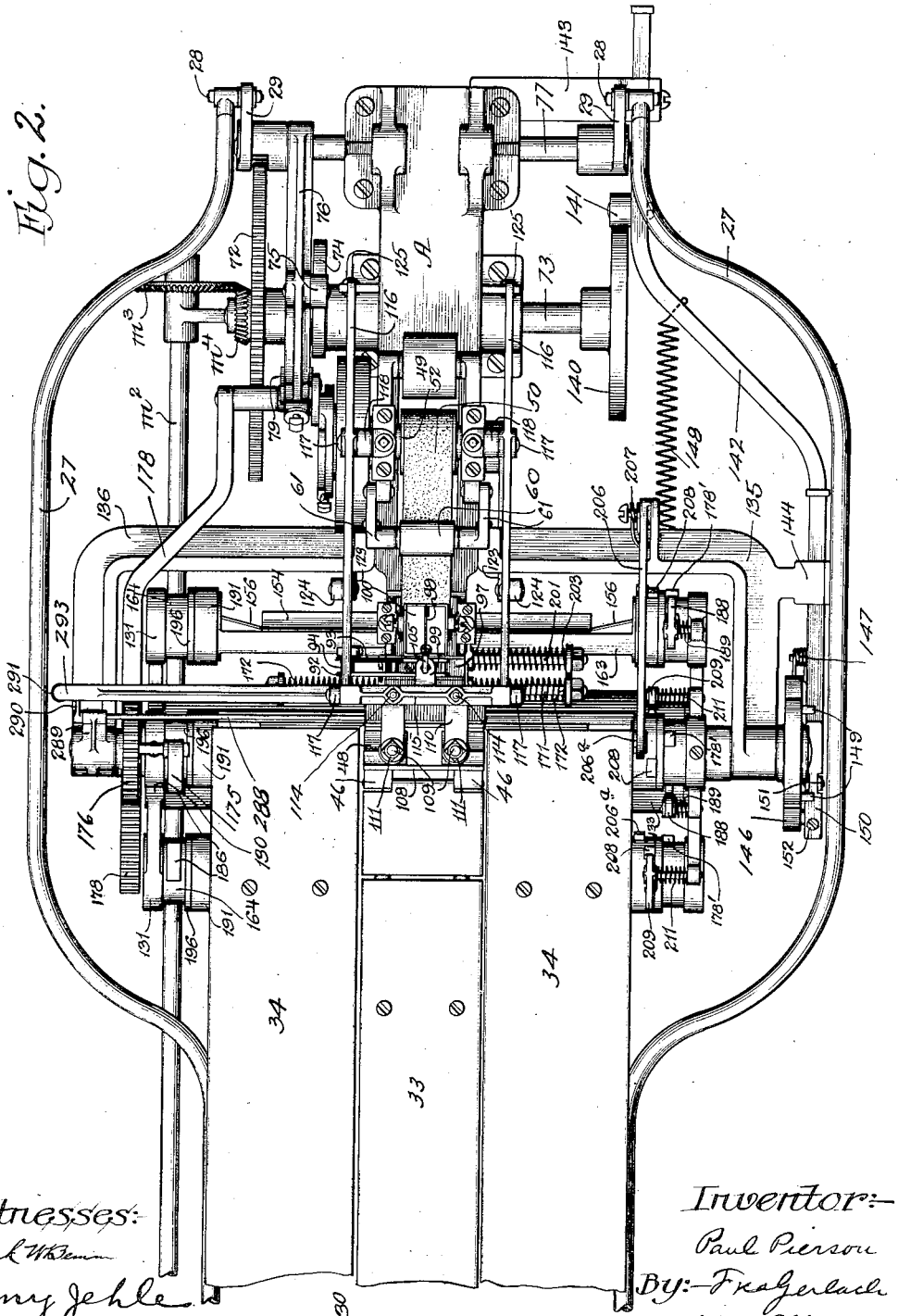
Figure 3:
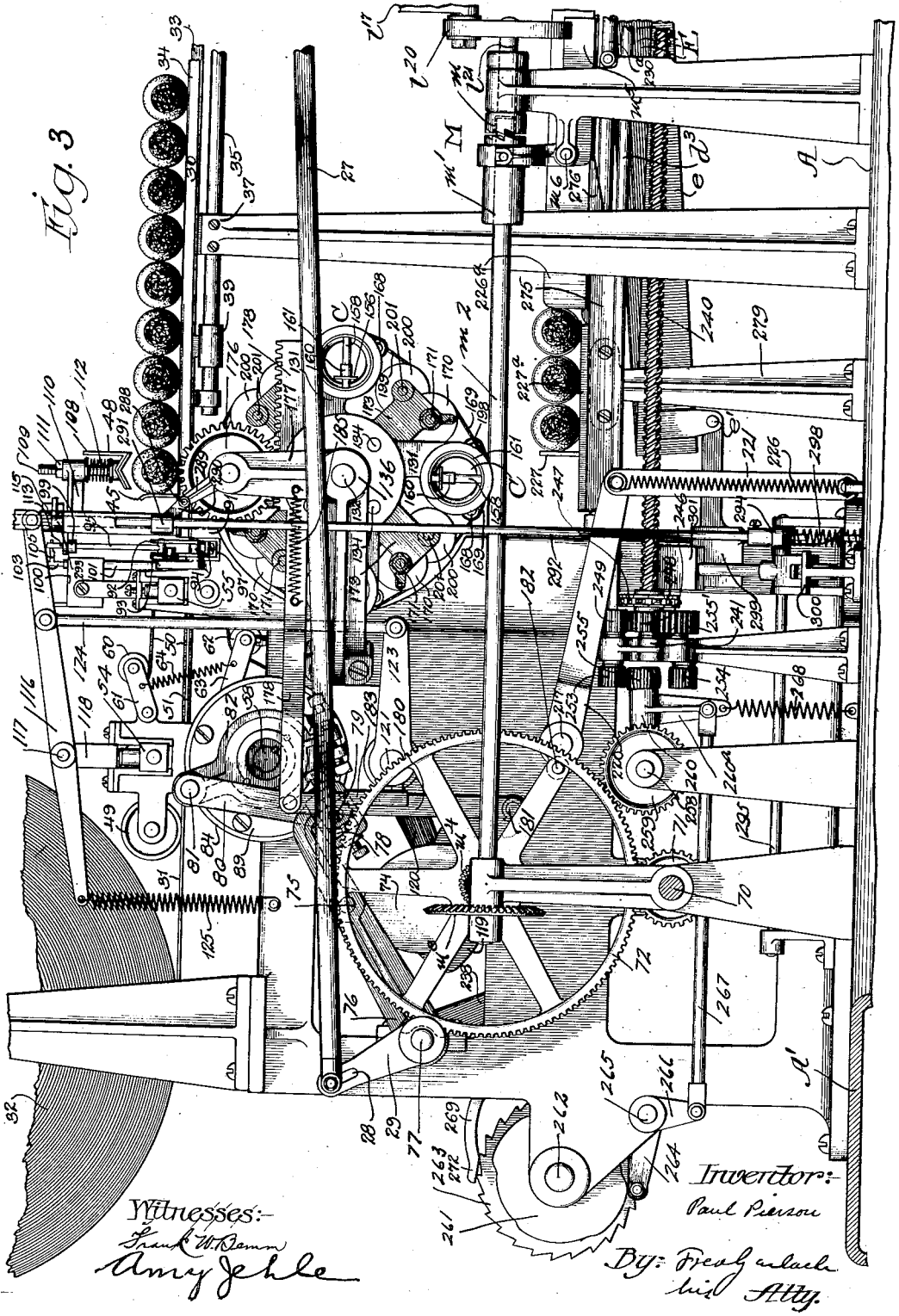
Figure 4:
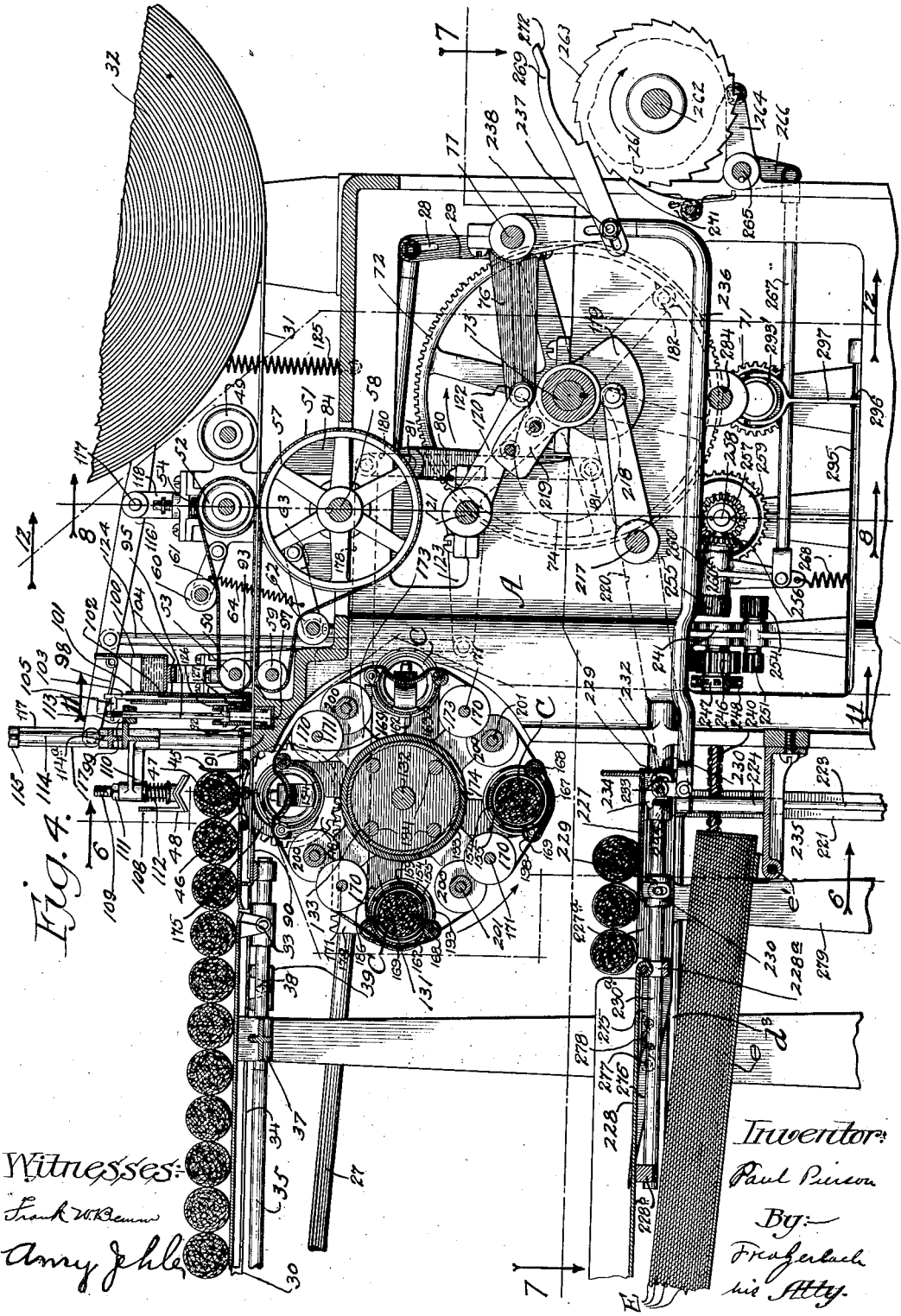
Figure 5:
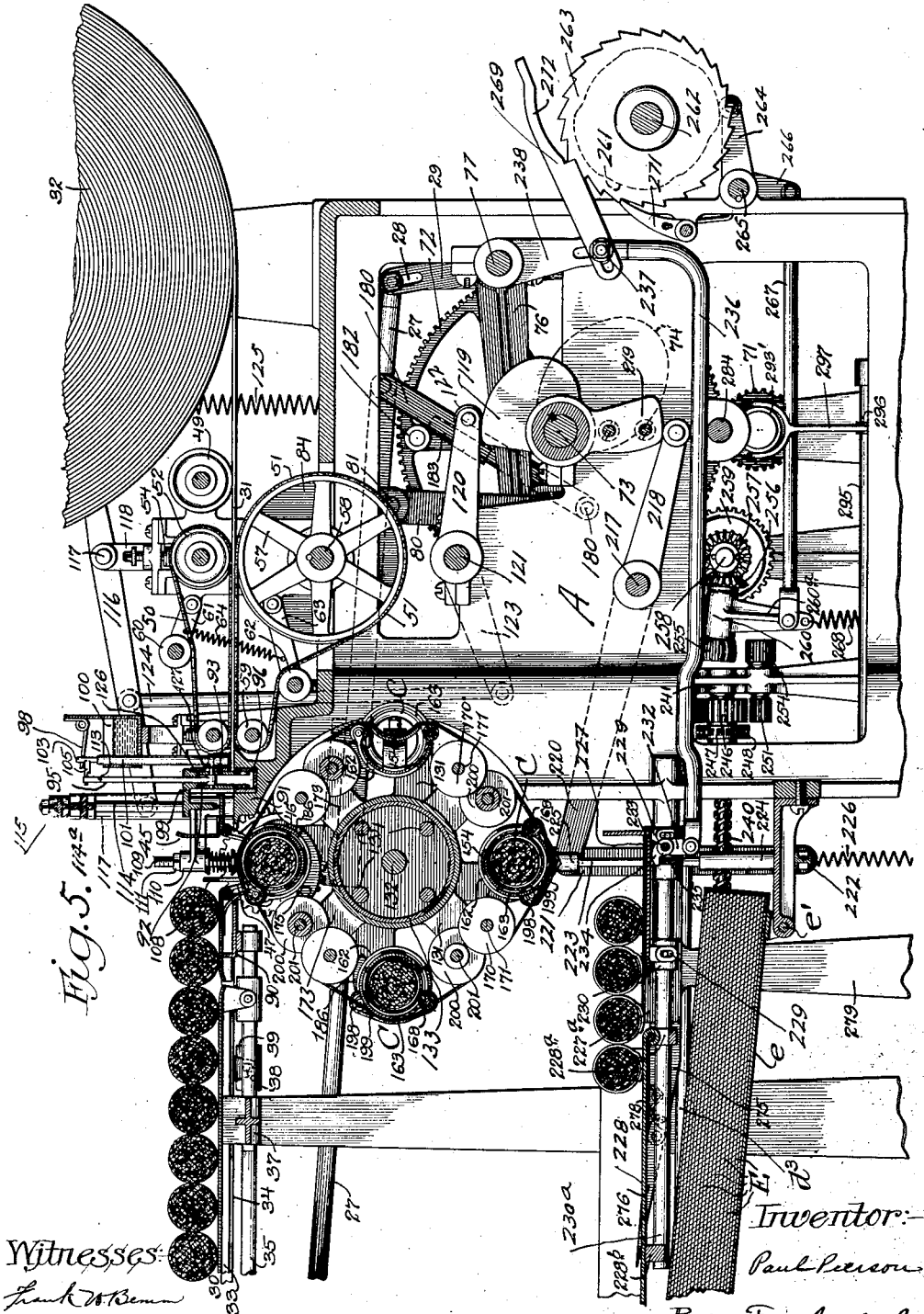
Figure 6:
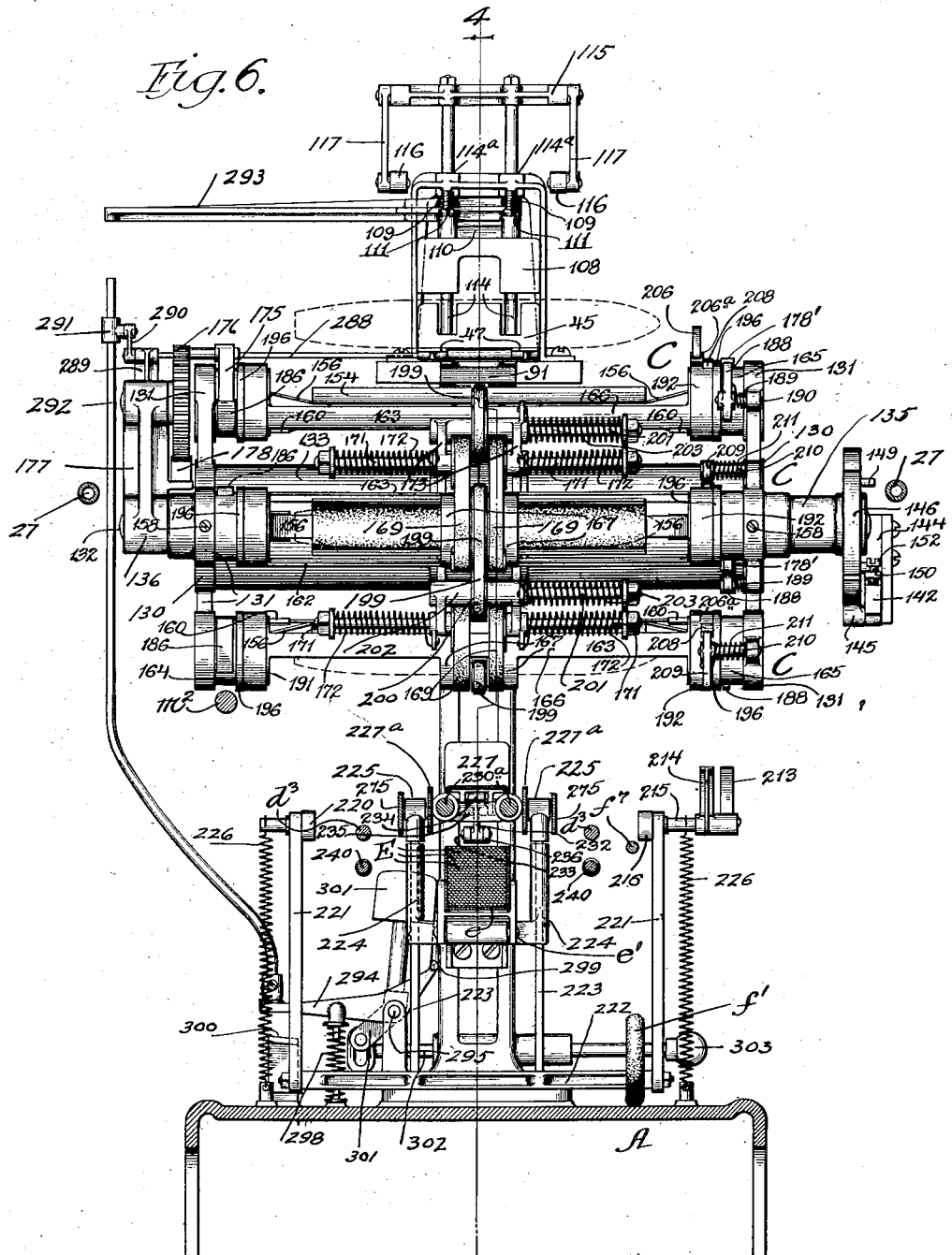
Figure 7:
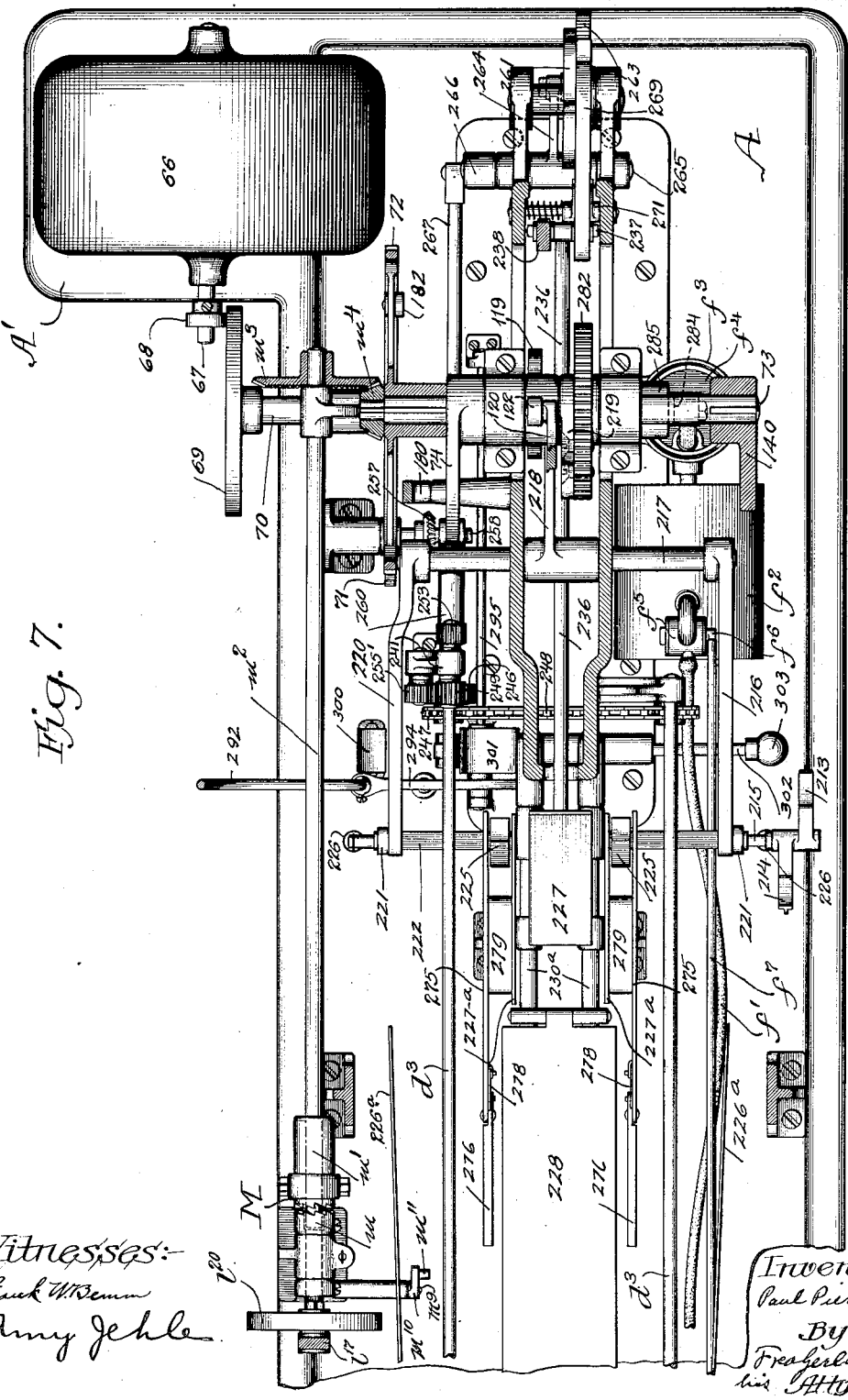
Figure 18:
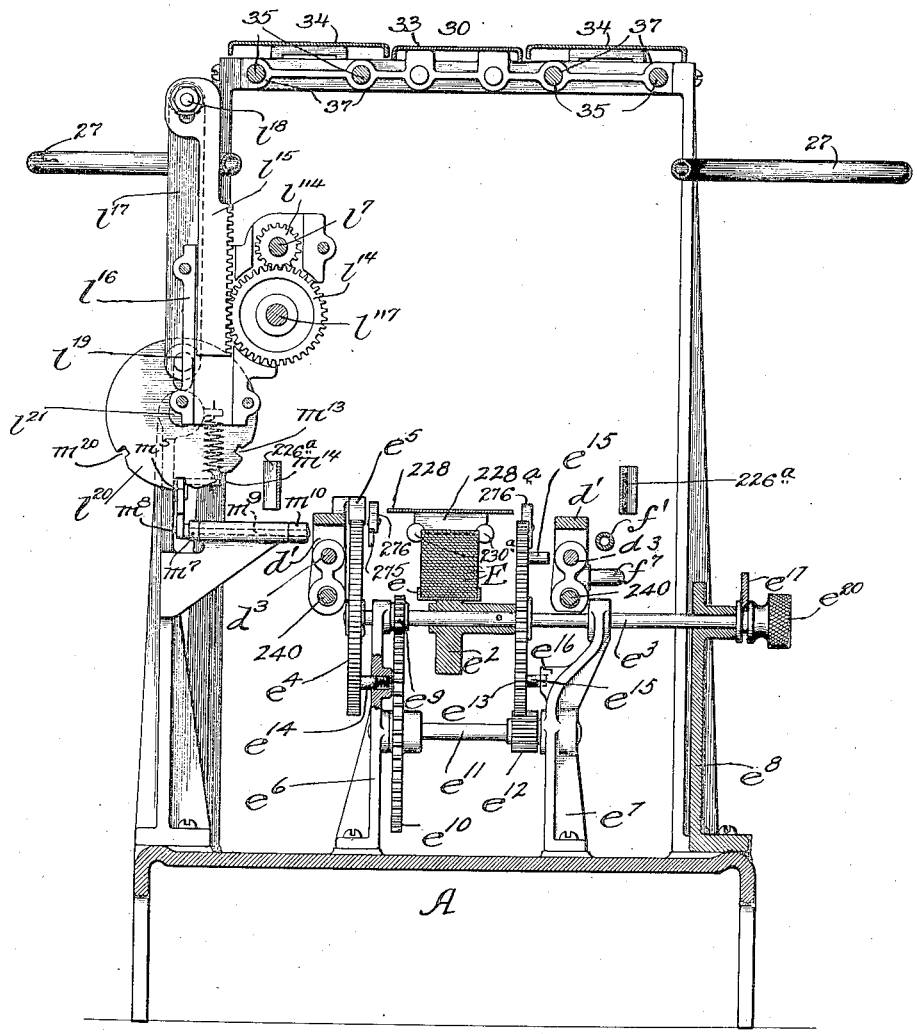

In the drawings: Figure 1 is a side elevation of a machine embodying the invention. Fig. 2 is a plan, a portion of the feed-table being broken away. Fig. 3 is a side elevation on a larger scale, than Fig. 1 illustrating the opposite side of that shown in said figure, a portion of the machine being broken away. Fig. 4 is a central section of the machine taken on line 4—4 of Fig. 6, illustrating the banding devices in the position assumed before a cigar is forced into the upper one of the banding-devices. Fig. 5 is a similar view showing the parts in position assumed right after the cigar has been forced into the uppermost banding-device and the latter has been operated to lay the wide end of band around the cigar. Fig. 6 is a vertical section taken on line 6—6 of Fig. 4. Fig. 7 is a horizontal section taken on line 7—7 of Fig. 4. Fig. 8 is a section taken on line 8—8 of Fig. 4. Figs. 9 and 9$^a$ are detail sections of the banding-devices, illustrating them in different positions in the course of their rotation. Fig. 9$^b$ is a perspective of one of the rotatable elements of the band-applying devices. Fig. 9$^c$ is a perspective of the other band-applying element. Fig. 9$^d$ is a perspective of one of the journals in which the ends of the band-applying elements are mounted. Fig. 9$^e$ is a perspective of the yielding cigar-support of one of the banding-devices which receive the cigars. Fig. 9$^f$ is a detail of one of the cigar-bands. Fig. 10 is an enlarged longitudinal section through a portion of the banding-mechanism. Fig. 10$^a$ is a detail of the clutch for operating the band-feeding mechanism. Fig. 10$^b$ is a section through the pump and reservoir for the pneumatic gripping-device of the mechanism for laying strips of wax paper between the rows of banded cigars. Fig. 10$^c$ is a perspective of the part at one side of the outer end of the row-transfer carriage. Fig. 11 is a transverse section taken on line 11—11 of Fig. 4. Fig. 12 is a section taken on line 12—12 of Fig. 4. Fig. 13 is a central longitudinal section of the mechanism for packing the banded cigars, the parts being shown in position assumed when the first row of cigars of a box has been fed to said mechanism. Fig. 14 is a similar view, showing the position assumed by the parts when a box full of banded cigars has been fed to the packing-mechanism. Fig. 15 is a vertical transverse section on line 15—15 of Fig. 13. Fig. 16 is a horizontal section taken on line 16—16 of Fig. 13. Fig. 17 is a horizontal section taken on line 17—17 of Fig. 13. Fig. 17ª is a plan of the follower of the packing-mechanism. Fig. 18 is a section on line 18—18 of Fig. 13. Fig. 19 is an enlarged detail view of the adhesive applying mechanism.

The improved banding-machine comprises a table 30 upon which the cigars to be banded will be fed, is adapted to apply bands cut from a continuous strip 31 of bands drawn from a roll 32, and comprises mechanism for feeding the cigars supplied to the table 30, to devices which will successively apply the bands severed from the web, as the cigars are delivered to the banding-mechanism, mechanism for feeding rows of banded cigars to mechanism which packs them in boxes, and mechanism for laying a strip of paraffin paper between the rows of cigars as they are packed.

The present machine is designed to receive cigars which have been packed in boxes and to apply bands to the cigars after they have been packed, so that the bands will be applied to the cigars in the resultant shapes which they have assumed in the boxes. It has been found in practice that if bands are applied to the cigars before they have been packed, the bands will become loose and irregular after the cigars are packed, so that the bands will not fit snugly around the cigars. The cigars which have been packed are laid upon the table in rows taken from the boxes, the cigars remaining in the order in which they are arranged when in the boxes, each row being laid in succession upon the table. The purpose of maintaining this order is to cause the banded cigars to be delivered into the or a like box from which they have been taken, in the inverse order in which they are removed therefrom, by the packing-mechanism. Feed-table 30 comprises a stationary central plate 33 which is suitably secured to the frame A of the machine and reciprocable plates 34 at the sides of the plate 33 (Fig. 2). Beneath each plate 34, a pair of guide-rods 35 (Figs. 4 and 15) are secured in lugs 37 of the frame. Each plate 34 is pivotally connected as at 38 to collars 39 which are slidably mounted on rods 35, and is operated longitudinally to move the cigars toward the band-applying mechanism, and vertically to cause them to engage and lift the cigars on the in-stroke, and downwardly to clear the cigars during the return or out-stroke of the bars. For this purpose, each plate has secured to its underside, brackets 40 (Figs. 1, 13, 14 and 15) which are connected to slidable collars 41 on rods 35, by pivot-pins 42 45 held in said collars and extending into slots 43 in said brackets. In each bracket 40, a lever 44 is pivoted on cross-pin 45 which extends between a pair of collars 41, and each lever 44 is provided with abutments or cams 44ª which are adapted to engage one of the plates 34, and raise it during the initial part of the in-stroke of the plate. Brackets 40 are provided with abutments 40ª for levers 44, which will be engaged by the levers to cause plates 34 to be operated longitudinally by the lever after the plate has been initially raised by cams 44ª. As levers 44 are operated inwardly by rods 27, they will initially swing on their pivots 45 and raise the outer ends of the plates 34, the latter swinging about on their pivots 38 (Fig. 4) until the levers engage abutments 40ª. Then the plates will be operated longitudinally by rods 27 and levers 44. During retraction of the plates 34 levers 44 will initially swing about their pivots to lower cams 44ª and the plates, and thereafter said levers will engage abutments 41ª on collars 41, and cause the plates to move outwardly in lowered relation to stationary plate 33. Rods 27 are adjustably connected as at 28, to arms 29 which are secured to a rock-shaft 77 which is operated by mechanism hereinafter set forth. In operation, bars 34 will be reciprocated and operated to advance the entire row of cigars on the feed-table, so that the foremost cigars will be successively fed to the banding-mechanism. The cigars on table 30 are fed forwardly intermittently toward a stationary abutment 45 (Figs. 3 and 5) which arrests the cigars and positions the foremost one in the path of a plunger 48 which is adapted to deliver the cigars to the banding-mechanism. The cigars on the feed-table, when reaching abutment 45 pass onto two oppositely disposed spring-pressed gates (Figs. 4, 5, and 6) 46 and 47 which are adapted to support the cigars in position beneath plunger 48 and to swing downwardly when the cigar is being forced into the banding-mechanism by plunger 48. These gates yieldingly hold the cigars until a banding device is ready to receive one, and guide them into the banding-devices.

The several mechanisms of the machine are driven by a motor 66 (Figs. 7 and 8) which is mounted upon the base A¹ of frame A and the shaft 67 of said motor has a small friction pulley 68 which engages the face of a friction-wheel 69 on a shaft 70 which is adapted to drive a pinion 71 which meshes with a gear wheel 72 on the main drive-shaft 73 of the machine (Fig. 3).

The bands supplied to the machine are on a continuous strip 31 of connected bands, wound on a roll 32. This strip passes under a guide-roller 49 which is journaled in the frame, and thence between a pair of endless feed-belts 50, 51, which serve to intermittently feed a portion of the strip corresponding to the length of a band, across the path of the cigars lowered by plunger 48 (Fig. 4). The upper belt 50 passes around rolls 52 and 53 both of which are journaled in adjustable spring-pressed bearings 54 and 55 (Figs. 1 and 3) respectively, to insure contact and firm gripping of the band-strip 31 between said belts. The lower belt 51 passes around a large pulley 57 which is secured on a shaft 58, and around a roll 59 which is journaled in the frame A and beneath roll 53. A belt-tightener 60 is applied to belt 50, being mounted at the end of pivoted arms 61, and a tightener 62, mounted on pivoted arms 63, is applied to the lower belt 51. Springs 64 are applied to said arms 61 63 to operate these tighteners to keep the belts taut at all times, and insure uniform feeding of the strip. Guide-roller 49 under which the strip 31 passes, causes straight feed of the strip into the bite of these feed-belts, despite variations in the size of the roll 32. Strip 31 is intermittently advanced by belts 50 51 a distance corresponding to the length of a band and after each advance, cutting mechanism is operated to successively sever the bands from the strip. The band-feeding belts 50 and 51 are intermittently operated by a cam 74 on shaft 73, which acts upon a stud 75 on an arm 76 which is secured to rock-shaft 77 (Figs. 2 and 3). Arm 76 is provided with a slotted terminal 78 in which is adjustably and slidably held, a bearing 79 (Fig. 3). A link 80 has its lower end pivotally connected to said bearing and its upper end pivoted to a stud 81 on an arm 82, which is fixed to one member 83 of a one-way clutch for intermittently operating the band-feeding mechanism (Figs. 3, 8 and 10ᵃ) in one direction. The other member 84 of said clutch consists of a hollow drum which has its hub fixed to the shaft 58 of pulley 57. Clutch-member 83 is journaled on the hub of drum 84 and has pivoted thereto, a series of links 85 which are pivotally connected as at 86 to a corresponding series of shoes 87 which are pivoted as at 88, to a disk 89 which is loose on the hub of member 83. Resultantly, when cam 74 operates arms 76 upwardly, link 80 will oscillate arm 82 to operate clutch member 83 and cause the dogs 87 to engage the flange of clutch-member 84 and rotate said member, which will operate shaft 58, drum 57 and belt 51. Such operation of belt 51 will cause the strip 31 held between said belt and belt 50, to be fed forwardly the correct distance corresponding to a band. During the down-stroke of arms 76, clutch dogs 87 will release member 84 and the belts will remain stationary. Belt 50 acts as an opposing surface for the band-strip and belt 51, and is frictionally driven by the belt 51, in synchronism therewith. The adjustable bearing 79 makes it possible to adjust, to a nicety, the operative stroke of the clutch so that the advance of the strip, caused by the rotation of pulley or drum 57, will correspond to the length of a band, and also adapts this feed mechanism for bands of different lengths. Rock shaft 77 also operates arms 28 and rods 27 to reciprocate the plates 34 of the feed-table, to feed a cigar to the banding-mechanism for each band advanced by band feeding-mechanism.

The front end of band-strip 31, after it has been fed forwardly, is supported by a plate 90 (Fig. 4) and the strip, after leaving belts 50, 51 rests upon a cutter-bed 91 and extends across the space or opening formed between support 90 and bed 91, through which the cigars are forced by plunger 48 to the banding devices, each cigar carrying a severed band with it. Mechanism for severing the bands from strip 31, comprises (Figs. 4, 5, and 11) cutters 92, 93 which are pivoted to the frame at 94, and to an operating rod 95. Each of the knives is adapted to sever the strip in connection with the upturned flanges 96 of a fixed cutter-plate 97 which is secured in a recess formed in the cutter-bed 91. The purpose in providing two knives is to cut away the blank portion usually left on the strip between the bands and so that, when an unusually long band is used and there is no blank space between the bands, one of the cutters 92 may be disconnected from operating rod 95 and thrown out of action, and so that, if an unusually short band is being used, both knives may be connected to rod 95 to cut away the blank portion between the bands. The cutting-stroke of the cutter-operating rod 95 is imparted thereto by a spring 98, (Figs. 4 and 5) under control of a reciprocating guide 99 through which the upper end of rod 95 passes, which is connected to the mechanism for operating the plunger 48 which forces the cigars downwardly through gates 46 and 47 into the band-applying devices, and which is operated by mechanism hereinafter more fully set forth. A pressure-plate 126 (Fig. 5) has a pin-and-slot connection 127 with knife 93 and engages the strip in advance of the cutters, to hold the strip against displacement by the cutters, being adapted to rest upon one of the upturned flanges 96 of the bed 97.

Adhesive is applied to the front end of each band, before it is severed from the strip 31, from a receptacle 100 which is mounted in elevated position upon the frame. A tube 101 extends through the bottom of said receptacle and the bore of said tube communicates with said receptacle by a port 102. A plunger 103 slides in said tube and is cut away as at 104 to permit a small quantity of the liquid to pass through tube 101 to the lower end thereof, where a small portion will be applied to a band during each reciprocation of plunger 103. The upper part of plunger 103 serves as a cut-off for port 102 so that only a small quantity of the adhesive can pass to the lower end of the tube during each reciprocation of plunger 103. The latter is operated conjointly with cutter-operating rod 95, being connected thereto by a stud 105. Spring 98 bears on plunger 103 which is connected to plunger rod 95 and thus serves to operate both the cutters and plunger 103 downwardly. The sliding connection between rod 95 and guide 99 provides a lost-motion connection which permits an extended stroke of plunger 48 relatively to the adhesive applying plunger 103 which is arrested by the bed 91.

Plunger 48 is V-shaped so that when it impinges against a cigar yieldingly held on gates 46 and 47 it will centralize the cigar with respect to the band-applying devices, despite variation in the size of the cigar. Said plunger is secured to the lower ends of rods 109 which are slidably mounted in a reciprocable frame 110, and have nuts 111 on the upper end thereof to limit the downward movement of the plunger by springs 112 (Figs. 4, 5, and 6). When frame 110 is lowered, plunger 48 passes into engagement with a cigar beneath it, to force it through gates 46 and 47. Springs 112 cause the plunger to exert a yielding pressure upon the cigars so that they will not be crushed when variation occurs in their size or shape. By adjustment of nuts 111, the tension of spring 112 may be adjusted so as to accommodate different size of the cigars upon which the machine is operated. Guide 99 which serves to operate the cutting and adhesive applying mechanism against the force of spring 98, is formed on reciprocable frame 110 so that the cigar feeding plunger 48, cutting mechanism and adhesive applying mechanism will be jointly operated. A stud 113 on cutter-operating plunger 95 is engaged by guide 99 to raise said rod after each cutting-operation, against the force of spring 98, and also causes said rod to be held in raised position by frame 110. Said frame is secured to rods 114 (Figs. 4, 5, and 6) which are slidably mounted in sleeves 114ª which are secured on frame A. A cross-head 115 connects said rods and is operatively connected to levers 116 by links 117 in brackets 118 and are operated intermittently by a cam 119 (Fig. 5) secured to drive-shaft 73. Said cam operates levers 116 by means of an arm 120 which is secured to a cross-shaft 121 mounted in the frame A and has a roller 122 bearing upon cam 119, arms 123 secured to the outer ends of shaft 121, and links 124 which are pivoted to the outer ends of arms 123 and to levers 116. Springs 125 serve to retract levers 116 and the parts operated thereby and to hold arms 120 in engagement with cam 119. Thus, this mechanism serves conjointly to intermittently operate the plunger which feeds the cigars to the band-applying devices and to control the operation of the cutters and the adhesive-applying mechanism. The operation of plunger 48, knives 92 93 and plunger 103 occurs after the operation of the band-feeding mechanism.

The band-applying mechanism comprises a series of four rotatable devices C, which are rotatably mounted to bring them in rotative succession, into position to receive a cigar and cut band from plunger 48, which apply the bands to the cigars and then discharge the cigars in inverted position before again passing into position to receive another cigar. By providing a series of rotatable banding-devices C, the capacity of the machine is increased, because while one of the devices is receiving a cigar, another will be holding the band around another cigar so that the adhesive will set, another device will be discharging a cigar and the next will be in readiness to receive another cigar (Figs. 4 and 5). These banding-devices are mounted in a rotatable carrier comprising ends 130 having arms 131 (Figs. 4, 5, 6, and 10) and are secured together by a cylindrical shell 133 and rods 134. This carrier is secured on a shaft 132 which is journaled in brackets 135 and 136 of the frame A. This rotatable carrier is intermittently operated to successively bring the devices C into their different positions, by a cam 140 (Fig. 7) which is secured to one end of drive-shaft 73 and acts upon a roller 141 on a bar 142 which is slidably mounted in brackets 143, 144 and carries a pivoted pawl 145. Said pawl is adapted to engage the teeth of a ratchet-wheel 146 (Figs. 1 and 2) and to operate the rotatable carrier a one-fourth revolution during each operation of bar 142. A spring 147 is applied to normally press pawl 145 into engagement with the teeth of ratchet wheel 146. A spring 148 is connected to bracket 144 and to bar 142 to retract said bar after each operation of the bar by cam 140 and to hold roller 141 in engagement with the edge of said cam. In operation of said carrier, it is important that each band-applying device should, during the periods of rest, be accurately positioned to properly receive a band and a cigar, and to cause the band-applying devices to be properly operated. For this purpose and to prevent overthrow of the carrier, ratchet 146 has projecting studs 149 on its outer face which are adapted to successively engage a stop 150 which is pivoted as at 151 to bar 142, and the pivotal movement of the stop in one direction is limited by an adjustable screw 152, a spring 153 serving to normally hold the stop 150 in position to cause screw 152 to engage bar 142. When the said bar reaches the limit of its movement in one direction as indicated in Fig. 1, one of the studs 149 will encounter stop 150 and be arrested thereby and another of said studs will be in a position to be arrested against backward movement by the opposite end of stop 150. In this manner, this mechanism serves to accurately position the carrier at the end of each operation and between the successive movements thereof, so that the carirer and banding-devices thereon will be shifted to the correct positions.

During each rotation of main drive-shaft 73, cam 140 will cause the reciprocation of bar 142 to operate pawl 145 and during the outward stroke of said bar, said pawl will operate ratchet 146 to rotate carrier shaft 132 and the carrier on which the banding-devices are mounted, a quarter of a revolution, to move a filled banding-device away from its receiving position and the next banding-device into position to receive a cigar and band. This carrier is operated one step for each band and cigar. After each movement of the carrier, it will be locked against rotation by studs 149 and stop-device 150, until a cigar and band have been placed into the uppermost banding-device C and the latter with the cigar and band therein is in readiness to be shifted to permit the next banding-device to be brought into receiving position. When the recess in cam 140, in the rotation of said cam, permits inward movement of roller 141, spring 148 will retract bar 142 sufficiently to bring pawl 145 into position to engage the succeeding tooth of ratchet 146 and when cam 140 operates bar 102 in the opposite direction against the force of spring 148, said pawl will rotate ratchet wheel 146 and the carrier, the stop 150 being then withdrawn from the path of studs 149, so that said ratchet wheel may turn and the latter will be rotated before said stop can pass into the path of the stud 149 last held thereby, thus causing the stop to pass into position to arrest the succeeding stud 149 and lock the ratchet-wheel as soon as the bar 142 reaches the limit of its outward stroke. This mechanism thus exemplifies mechanism for intermittently operating the carrier for banding-devices and successively bringing them into position to receive cigars and bands, which will be applied to the cigars by the said devices and subsequently discharged.

The banding devices C are similar in construction and each comprises a curved support 154 which has its face which receives the cigar preferably covered with a strip of soft material, such as chamois 155 (Figs. 9e and 10). This support extends longitudinally of the carrier and has resilient laterally extending arms 156 having slots 157 therein through which extend pins 158 which are fixed in arms 131 of the carrier. A spring-strip 159 is secured to support 154, to yieldingly press it outwardly, the outer ends of the arms 156 having sleeves 160 bearing normally against bearing-sleeves 161 which are fixed in carrier-arms 131 and into which arms 156 of support 154 extend. Slots 157 are elongated to permit support 154 to slide inwardly and outwardly on pins 158 and also to permit flexure of arms 156 according to the different shapes of the cigars. Support 154 receives the cigar with the underlying band as they are forced downwardly between gates 46 and 47 by plunger 48. The latter forces the cigar downwardly and presses the cigar against support 154, the band being held between the cigar and support.

Each banding-device comprises elements 162 and 163, which are independently revoluble in the carrier and relatively to the cigar and support 154, one of said elements being rotatable to snugly lay one end of the band around the cigar and the other element being also rotatable to press the gummed end of the band over the first laid end and to cause the band to be thus wrapped around the cigar. Each element 163 (Figs. 9c and 10) comprises a bearing-shell 165 at one end, a similar shell at the other end thereof, and a cross strip 166 whereby said ends are secured together. Shells 164 and 165 are rotatably mounted on the bearing-sleeves 161 in carrier arms 131, and ball-bearings 166' are provided between each of the shells and said bearing sleeves. Banding-element 163 is provided with two curved arms 167 adjacent the longitudinal center thereof, but separated from each other to leave sufficient space for the operation of the other banding-element between them. Each arm 167 carries a roller 168 which is adapted to act upon a flexible presser-strip 169. Each of said strips has one of its ends connected to support 154, being integrally formed with covering 155, and its other end is connected to an automatic take-up device (Figs. 5 and 6) comprising a drum 170 around which the end of said strip passes and to which it is secured, a shaft 171 to which said drum is secured and a spring 172 which is applied to keep the strip taut and to permit arms 167 to unwind the strip from the drum and press the strip against the band and cigar. Said shafts 171 are journaled in arms 173, which are rigid on a ring 174 which is secured to the shell 133 of the carrier. After a cigar and the underlying band have been forced into the uppermost banding-device while the carrier is stationary, the banding-element 163 is rotated in the carrier to cause arms 167 and rollers 168 to wrap the wider end of the band around the cigar and by reason of the flexibility of these strips, the band will be laid snugly around the cigar even though the cigars be irregular or varying in shape or size. This operation of element 163, arms 167 and rollers 168, is effected by a pawl 175 (Figs. 1, 5, 6 and 9) which is pivoted to a gear 176 journaled in an arm 177 on the frame and is intermittently operated by a rack 178 (Fig. 3). Rack-bar 178 is pivoted to an arm 180 which is pivoted to the main frame at 181. Said arm is operated to reciprocate rack-bar 178 by a stud 182 on gear-wheel 72 which is adapted to engage a plate 183 which is adjustably connected to said arm so that the throw of the arm and rack-bar may be varied by the bolt-and-slot connection 184 (Fig. 8). A spring 185 retracts rack-bar 178, gear 176 and pawl 175. Each banding-element 163 is provided with a tooth or abutment 186 on its bearing sleeve 164, which is adapted to be engaged by pawl 175, to rotate said element sufficiently to cause arms 167 to press and fold the wide end of the band snugly around a cigar. The other sleeve 165 of banding-element 163 is provided with a tooth or abutment 178' which is adapted to be engaged by a dog 188 which is normally spring-pressed into the path of tooth 178' by a spring 189 and is adapted to lock said element against retraction by spring-pressed drums 170 acting upon strips 169, and so that said element will be locked in position to cause said strips to hold the wide end of the band around the cigar until it is released. Each dog 188 is pivoted as at 190 to a lug on one of the carrier-arms 130.

The other banding-element 162 (Fig. 9$^b$) comprises sleeves 191, 192 and a cross strip 193. These sleeves are journaled upon the bearing-sleeves 164 and 165 of banding-element 163 by means of a ball-bearing 194 (Fig. 10) interposed between the sleeves of the elements respectively. Collars 196 on sleeves 164 and 165 of banding element 163 hold element 162 against endwise movement. Element 162 is thus rotatable in the carrier and is provided with a central arm 197 carrying a roller 198 which is adapted to engage a central flexible strip 199 disposed between the strips 169 which are operated by the other banding-element. Strip 199 is connected to support 154, being integral with the covering 155 thereof and its other end is connected to a yielding automatic take-up device comprising a drum 200 on a shaft 201 (Figs. 4 and 6) which is journaled in lugs or arms 202 on ring 174, and a spring 203 which is applied to said shaft to wind strip 199 on drum 200 and which will permit the strip to be unwound from the drum by the arm 197 and roller 198, when banding-element 162 is rotated in the carrier around a cigar. Strip 199 is adapted to fold or press the narrow end of the band around the cigar and over the wide end of the band which has already been laid around and is being held on, the cigar by strips 169. Banding-element 162 is rotated to effect the operation of arm 197 and roller 198, by an arm 206 (Figs. 1 and 9) which is pivoted to the frame as at 207, and has its outer terminal formed to engage a tooth or abutment 206$^a$ on sleeve 192 of said element.

As the carrier is rotated the uppermost banding-device moves away from the arm 206, its end will engage tooth 206$^a$ and cause element 162 to turn in the carrier as the latter is shifted, thus causing arm 197 and roller 198 to press the strip around the cigar and cause the narrow end of the band to which the adhesive has been applied, to be laid over the wide end of the band and around the cigar, and completing the wrapping of the band around the cigar. Each sleeve 192 of banding-element 162 is provided with a lug 208 which is adapted for engagement with a dog 209 which is pivoted to a lug on the carrier-arm 131 as at 210. Dog 209 is normally pressed into the path of said lug by a spring 211, so that when the banding-element 162 is rotated the lug 208 will pass under dog 209 and the latter will engage said lug to lock said element and hold strip 199 in position around the band and cigar. Banding-elements 162 and 163 thus remain locked until dogs 188 and 209 are released by the mechanism hereinafter set forth, which occurs after the carrier has been turned two steps or one-half revolution and the banding-device with a cigar therein has passed to its lowermost position.

In operation, the banding-devices C as they are successively shifted and arrested in position to receive a cigar and band, apply a band around the cigar and hold both ends of the band around the cigar during substantially two steps of the operation of the carrier and a sufficient period to cause the adhesive to dry so that the band will remain applied around the cigar. As a result of employing a series of rotating banding-devices, as thus exemplified, they may be quickly operated in rapid succession to receive the cigars and apply the bands to hold the bands around the cigars a sufficient period to cause the ends of the band to adhere together. By employing mechanism in which both ends of the band are simultaneously held around the cigars independently, each band will be snugly wrapped around the cigar despite any irregularity in the shape of the cigars, without danger of breaking the wrapper on the cigars, and without rotating the cigars relatively to the banding-elements.

The operation of overlapping the narrower end of the band is accomplished as follows: The arm 197 on the banding element 162 is rotated so as to pass between the arms 167 on the banding element 166 which hold the wider portion of the band while the arm 197 holds the narrower portion and thus the narrower end of the band passes between the two arms 167 and is lapped over the wider end.

Banding devices C are successively operated to release the banded cigars, by releasing the locking dogs 188 and 209 of the elements 166 and 162 respectively and by a device (Figs. 1, 5, 6, 7 and 9) comprising oppositely inclined abutments 213 and 214 which are pivoted as at 215, to an arm 216 which is secured to a shaft 217 which is journaled in the main frame. These abutments 213 and 214 are adapted respectively to engage dogs 209 and 188 when arms 216 are raised so that the banding-elements respectively will be released and will be restored to normal position by the automatic take-up devices acting upon strips 169 and 199. Shaft 217 is intermittently operated to raise releasing-arms 213 and 214 into operative position every time the banding-device carrier is advanced one step, and a banding-device with a banded cigar therein is brought into the lowermost position, by an arm 218 which is secured to shaft 217 which is acted upon by cam 219 fixed on main cam-shaft 73. An arm 220, similar to arm 216 is secured to shaft 217 and is conjointly operated with arm 216, and to each of said arms 216 is pivoted a pendent link 221. A cross-bar 222 (Fig. 6) connects the lower ends of links 221, and operates a pair of plungers 223 which are mounted to slide in a stationary guide 224. Each plunger 223 is provided with a V-shaped support 225 at its upper end, upon which the banded cigars will fall when released from the banding-devices upon release of the locking dogs. Springs 226 are applied to retract or lower arms 216 and 220 and supports 223. By this mechanism, the cigars in the banding-devices will, as the carrier is rotated step-by-step, be successively released and transferred onto supports 225, which will lower the cigars onto suitable bars or tracks 227ª.

The banded cigars deposited on the bars 227ª are transferred by a reciprocating pusher 227, to table 228, from which rows of cigars are delivered to the packing-mechanism, after the rows corresponding in number to the rows as originally packed have accumulated thereon. Pusher 227 is provided with depending lugs 229 which are connected to collars 230 (Figs. 4, 5, and 6), by studs on said collar which extend into slots on the lugs. Collars 230 are slidably mounted on fixed rods 230ª. By these stud-and-slot connections, pusher 227 will be raised to engage the cigars on bars 227ª during the forward stroke of the table, so that the cigars resting on bars 227ª will be lifted off the bars and moved onto table 228 without causing the cigars to roll. This vertical and longitudinal movement is imparted to pusher 227 by a lever 232 which is pivoted on a cross-pin 233 and has a cam 234 which is adapted to raise the pusher slightly and to engage an abutment 235 on one of the collars 230. Lever 232 is operated by a pitman 236 which is pivoted to said lever, and as at 237, to an arm 238 which is secured to and operated by shaft 77. Resultantly during each operation of the banding-mechanism, arm 238 will be oscillated once, to operate pitman 236, which will operate lever 232 to initially raise pusher 227 and then to operate it longitudinally to move the banded cigars onto table 228. During retraction of rod 236, lever 232 will swing initially into engagement with abutment 235 to lower the pusher and then cause it to return to its normal position (Fig. 4) without distributing the banded cigars which have been advanced thereby. Pivot-pin 237 is adjustable in a slot in arm 238 to vary the stroke of pitman 236 according to the thickness of the cigars to be banded. Table 228 is sustained at its inner end by a bracket 228ª on rods 230ª (Fig. 4), and is pivoted to said bracket to permit the table to be raised for access to the parts beneath it, and at its opposite end the table has a bar 228ᵇ which rests on said rods. Side-strips 228ᶜ guide the ends of the cigars onto the table.

The rows of banded cigars on table 228 are transferred to the packing-mechanism by a reciprocating carriage D, in rows of different numbers according to the rows as they were originally packed. In practice, for example, in boxes containing fifty cigars, it is customary to pack the cigars in alternating rows of 12 and 13, and controlling-mechanism is provided for the operating-mechanism for the carriage D (Figs. 1, 13, and 16), which causes the carriage to be operated accordingly. Carriage D comprises plates $d$ secured to brackets $d'$ (Fig. 15) which are slidably mounted on rods $d^3$, and arms $d^4$ which are pivoted to bars $d$ at $d^6$ (Fig. 13) and have upturned ends $d^5$ for engaging the last deposited of a row of cigars. The mechanism for reciprocating this carriage comprises a pair of screw-shafts 240 which extend in the direction of the travel carriage (Figs. 1, 3, 11), are journaled in suitable bearings 241, (Figs. 1 and 3) and 242 (Fig. 1), and are adapted to reciprocate said carriage, said rods extending through screw-threaded holes in the brackets $d'$ (Fig. 18). These screw-shafts 240 are intermittently driven to reciprocate carriage D when a row of cigars has been delivered thereto, by a pinion (Figs. 3 and 11) 246 on one of said screw-shafts, sprocket-wheels 247 on said shafts respectively and a chain 248 extending around said sprockets. Said pinion is driven in one direction to advance the carriage, by a pinion 249 (Fig. 3) on a shaft 250 above gear 246; and in the opposite direction to retract the carriage by a pinion 251 on a shaft 252 below said screw-shaft. Shaft 250 has secured thereto a gear 253 and shaft 252 has secured thereto a gear 254. Both of said gears are adapted to be operated by a gear 255 which is adapted to be shifted into mesh with either of said gears and out of mesh with both, when it is in a central position therebetween. Pinion 251 (Fig. 11) operates a gear 246 through an idler gear 255' which causes the movement to be reversed. When gear 255 is shifted into engagement with gear 254, screw-shafts 240 will be driven in the opposite direction to that in which pinion 249 drives them. Constant rotary motion is imparted to gear 255 by a gear 256 which is secured to the shaft of gear 255 and meshes with a gear 257 on a shaft 258 (Figs. 4 and 5) which is driven by a gear 259 which meshes with gear 72 (Figs. 4 and 7) on drive-shaft 73. The shaft to which gears 256 and 255 are secured is mounted in a bearing 260 which is pivoted to swing about shaft 257 so that gear 255 may be shifted into engagement with either of the gears 253 and 254 or into neutral position between them.

The operation of gear 255 is controlled by mechanism which first causes said gear to be shifted into mesh with gears 253 to operate screw-shafts 240 to cause carriage D to carry a row of cigars to the packing mechanism, then to cause gear 255 to retract it, and then to put gear 255 into neutral position to cause the carriage to remain stationary until another row of cigars has accumulated on the carriage D. This controlling-mechanism comprises a cam 261 (Fig. 3) on a shaft 262 which is journaled in the frame and is secured to rotate with a ratchet-wheel 263 on said shaft. An arm 264 is secured to a rock-shaft 265 which is pivoted in the frame A and has an arm 266 on its outer end which is operatively connected to an arm 260ª on the bearing 260 by a rod 267. A spring 268 is applied to arm 260ª to hold arm 264 in contact with cam 261. Ratchet 263 is operated by a pawl 269 which is connected to arm 238 by the pin which connects the operating rod 236 for pusher 227 to said arm. Ratchet wheel 263 and cam 261 will be operated one step for each operation of pusher 227 to advance a banded cigar, a spring pressed dog 271 engages the ratchet to prevent retraction thereof. Pawl 269 is provided with a handle 272 whereby it may be disengaged from the ratchet to permit the latter and cam 261 to be rotated to cause the cam 261 of the controlling-mechanism for carriage D to be set as desired in commencing the operation of the machine. The operating surfaces on cam 261 are differentially formed so that the carriage will be caused to operate upon rows of different numbers of banded cigars. For example, when fifty cigars are being packed in a box, the cam will be operated two revolutions for each box and the cam is formed to cause the driving mechanism to become operative upon alternating rows of 12 and 13 cigars. By variation of the cam-surfaces on cam 261 and the number of teeth on ratchet 263, the operation of this transfer mechanism may be varied to cause the rows of different numbers to be shifted to the packing-mechanism.

Arms $d^4$ on carriage D are normally pressed into raised position by springs $d^8$ (Fig. 13) and are each formed with an inwardly projecting stud $d^9$ (Figs. 13 and 16). During retraction of the carriage these studs engage tracks 275 (Fig. 14) to lower arms $d^4$ and cause their upturned terminals to pass beneath the cigars on table 228 until they have passed beneath the last cigar of a complete row, and when said studs pass off said tracks, springs $d^8$ will raise the arms into position shown in Fig. 14. Each track 275 comprises a switch 276 which is pivoted thereto at 277 and is normally held in the path of one of the studs $d^9$ by a spring 278. During the out-stroke of the carriage, said studs will pass over and depress said switches and during the in-stroke, the switches will guide the studs under tracks 275. The latter are supported by brackets 279 which also support the bars 227ª.

Fingers O on a rock-shaft O' are adapted to be swung into position to permit a row of cigars in transit on carriage D to pass under them and to hold the cigars against return with the carriage (Figs. 13, 15 and 16). This shaft is operated by arm $O^2$ pivoted to one side of carriage D, which is normally stopped in a horizontal position (dotted lines Fig. 14), and engages a pocket $O^3$ in an arm $O^4$ fixed on shaft O' at the end of the out-stroke of the carriage, to swing fingers O into position to hold the row of cigars last advanced, against return with the carriage. A latch $O^5$ pivoted at $O^6$ engages a stud $O^7$ on arm $O^4$ to hold the fingers O in operative position until the row of cigars has been lowered and until after the carriage has been retracted. A sinuous cam-surface $O^8$ on one of the side-plates $l$ of a vertically movable frame L, engages a stud $O^9$ on latch $O^5$ to release arm $O^4$ and permit the fingers O to swing upwardly after each row of cigars has been lowered, as hereinafter set forth.

The operation of this row-transfer mechansim will be as follows; for each banded cigar deposited on bars 231, arm 238 will operate pusher 227 to advance the cigar as well as all of those previously deposited, and said arm will also operate pawl 272 to rotate ratchet 263 and cam 261 one step.

Normally carriage D is in the position shown in Fig. 14. When sufficient cigars to form a row of 12 banded cigars have been deposited on table 228 and bars 227$^a$, cam 261 will operate arm 264 to shift the shaft 265, arm 266, rod 267 and arm 260$^a$ to shift bearing 260 into position to cause gear 255 to mesh with gear 254 and thus cause screw-shafts 240 to operate the carriage D toward the packing-mechanism to transfer the entire row of cigars thereto. After the row has been transferred to the packing-mechanism, cam 261 will cause gear 255 to be shifted into engagement with gear 253 which will cause the screw-shafts 240 to be driven in the reverse direction and cause the carriage to be retracted. When the carriage has been retracted cam 261 will cause gear 255 to be disengaged from gear 253 so that the carriage will remain stationary until a row of 13 cigars has been placed into position for transfer by the carriage and then the operation of the carriage will be repeated as before.

Mechanism is provided for laying strips of paraffin paper E between the rows of cigars delivered to the packing-mechanism, to prevent the cigars of one row from adhering to those in the adjacent rows. These strips E are held in a holder $e$ (Fig. 14) which is pivoted at one end as at $e'$, is inclined upwardly from said end and has its other end operated by a cam $e^2$ on a shaft $e^3$ to raise the stack of the strips as they are used, so that the uppermost strip will always be disposed in position to be removed by a pneumatic gripping-device $f$.

A ratchet-wheel $e^4$ on shaft $e^3$ is operated one step during each reciprocation of carriage D, by a pawl $e^5$ which is pivoted to one of the brackets $d'$ on said carriage to raise holder $e$ as the stack thereon diminishes. Ratchet $e^4$ is fixed on shaft $e^3$ (Fig. 18) and the latter is journaled in brackets $e^6$, $e^7$, and $e^8$. A pinion $e^9$ is also fixed on shaft $e^3$ and drives a gear $e^{10}$ on a counter shaft $e^{11}$. A pinion $e^{12}$ on the counter shaft drives a gear $e^{13}$ to which cam $e^2$ is secured. A friction-device $e^{14}$ mounted in bracket $e^6$ presses against ratchet $e^4$ to prevent overthrow. Stops $e^{15}$ are adapted to engage a lug $e^{16}$ to limit rotation of cam $e^2$. Shaft $e^3$ is slidable in its bearings so that said gear $e^9$ may clear gear $e^{10}$ when it is desired to set back container $e$, as shown in Fig. 18. A handle $e^{20}$ is secured to the outer end of shaft $e^3$ and a latch $e^{17}$ is adapted to enter a groove in said handle to hold the shaft against endwise movement so that pinion $e^9$ will be operative.

A suction nozzle $f$ is pivoted to the outer end of the carriage and is adapted, on its out-stroke, to contact with and carry the uppermost strip outwardly with the carriage. At the end of the in-stroke of carriage D, nozzle $f$ engages an incline 280 on table 228, which causes the nozzle to swing against the top-strip E in holder $e$ (Fig. 14). The chamber in nozzle $f$ is connected by a hose $f'$, with the vacuum chamber in a tank $f^2$. The air in said tank is exhausted therefrom by a pump $f^3$ (Figs. 1 and 10$^b$) which is driven by a gear 282 on drive-shaft 73, which meshes with a gear 283 (Fig. 8) on a shaft 284 which is connected by a crank 285 and pitman 286, to the piston $f^4$ of the pump. Suction of air through nozzle $f$ is controlled by a three-way valve $f^5$ (Fig. 10$^b$) which has an arm $f^6$ on its stem. A rod $f^7$ secured in one of the brackets $d'$ and reciprocating with carriage D, has an abutment $f^7$ (Fig. 1) for operating said valve to connect nozzle $f$ through hose $f'$, with the vacuum-chamber in tank $f^2$ and cause the suction of air through a hole $f^{10}$ in said nozzle, to hold the top strip E so that said strip will be carried outwardly with the carriage D and laid beneath the row of cigars on the carriage. Said rod also has an abutment $f^8$ which engages valve-arm $f^6$ at the end of the out-stroke of the carriage, to open valve $f^5$ and admit air to the nozzle so that the strip will be released and fall into the box in which the cigars are being packed.

Since it is important that the banded cigars should be delivered to the packing-mechanism in rows constituted of the same cigars as the rows in the box, from which the unbanded cigars are taken, and since it may occur that a cigar is not placed in position to be fed to the banding-mechanism for the feed-table, an automatic throw-off is provided which will cause the machine to be arrested or rendered inoperative whenever it occurs that no cigar is fed to the banding-mechanism, so that cam 261 and ratchet 263 which control the operation of carriage D may be set back one step. By resetting this cam and ratchet, the formation of rows of banded cigars in exact accordance with the rows taken from the box of unbanded cigars, will result, despite any lapse in the feed to the banding-mechanism. This automatic throw-off is controlled by gate 47 which is operated by a cigar every time one is pushed into one of the banding-devices. This gate is secured to a pivot-rod 288 (Fig. 6) which is journaled in a lug 289 on bracket 136 (Fig. 3) and has an arm 290 secured to its outer end. This arm is pivoted to a collar 291 on a rod 292, and is adapted to shift said rod into, and out of, the path of an abutment 293 which is on, and reciprocates with, frame 110 which carries cigar-feeding plunger 48. Rod 292 is adapted to operate a clutch 293' (Fig. 8) on shaft 70 so that gear 71, which drives all mechanisms of the machine, may be rendered inoperative. When, after each operation, of the band-feeding mechanism, a cigar is forced between gates 46 and 47 by plunger 48, rod 288 which rocks with gate 47, will swing arm 290 to move rod 292 out of the path of abutment 293. If no cigar is pushed between said gates, rod 292 will be operated downwardly by reciprocating abutment 293 and disconnect gear 71 from shaft 70 and thus automatically stop the machine. Rod 292 has its lower end connected to a lever 294 which is secured to a shaft 295 (Figs. 3, 6 and 8). A small eccentric 296 (Fig. 8) is secured on shaft 295 and is disposed in a slot in a lever 297 which has its lower end pivoted to the frame and its upper end suitably connected to one member of clutch 293. A light spring 298 is applied to lever 294 to hold rod 292 normally raised. An abutment 299 on lever 294 which is adapted to strike the frame, and a stop 300 limit the throw of said lever. A weighted lever 301 secured to shaft 295 is adapted to cross the vertical center of said shaft and hold it and its connected parts, in shifted position, to retain the clutch 293 inoperative to drive the machine. A rod 302 is slidably mounted in the frame, is operatively connected to lever 301, and has a handle 303 whereby the clutch 293 and the throw-off mechanism may be manually shifted to render the machine operative. This automatic throw-off mechanism, the operation of which is controlled by the cigars fed to the banding-devices, causes the machines to be stopped either when the supply of cigars is exhausted, or when there is a lapse in the cigar feed. The machine is designed for continuous operation, but if the feed lapses, the machine will stop to give the operator an opportunity to set back the controlling-mechanism for the row-feed to the packing-mechanism so the operation of carriage D will be timed to feed rows exactly the same as they are taken from a box. In finishing a run, the machine may be caused to operate on the cigars in transit through machine, by placing in sufficient dummy cigars to finish the last box of cigars.

Mechanism H (Figs. 1, 13, 14, 15 and 16) for holding a cigar-box in position to receive the banded cigars from the packing-mechanism is adjustable for boxes of different sizes and shapes, and comprises a support $h$ on which the boxes are held; a side-bar $h'$ which is slidably held on said support by screws $h^2$ which extend through slots $h^3$ in said support; adjusting-screws $h^4$ which extend through collars $h^5$ held in lugs $h^6$ on said support and serve to position said bar according to the width of the cigar-box; a spring-clamp $h^7$ having a stem $h^8$ slidable in a sleeve $h^9$ adjustably secured in a lug $h^{10}$ on support $h$, and adapted to be quickly manipulated to secure or release the cigar-box, by a lever $h^{11}$; and adjusting-mechanism whereby support $h$ may be raised or lowered according to the height of the cigar-box. The latter mechanism comprises a pair of posts $g$ which are vertically slidable in guides $g'$ in the base $A'$, racks $g^2$ on said posts, gears $g^3$, $g^4$ engaging the racks respectively and meshing with each other, a shaft $g^5$ (Fig. 15) to which $g^3$ is secured, a crank $g^6$ on the outer end of said shaft, and a finger-lever controlled lock $g^7$ for securing said mechanism in its different positions. By adjustment of crank $g^7$, the gear and rack mechanism may be operated to vertically adjust support $h$ so that the upper edges of boxes of different heights will be held in proper relative position beneath the packing-mechanism.

Carriage D transfers the rows of cigars to a skeleton frame L which is adapted to be lowered step-by-step in the cigar-box, as the rows are successively delivered thereto and to be withdrawn from the box. This frame L comprises a pair of cross-bars $l$ (Figs. 15 and 17$^a$), side plates $l'$ secured to said bars and having inturned ends $l^2$, and bottom strips $l^3$ pivoted to the lower edges of side plates $l'$ and normally pressed into angular relation to said plates by springs $l^4$ (Figs. 13, 15 and 16) so that the first row of cigars for each box will rest thereon. This frame L is suspended from rack-bars $l^5$, to the lower ends of which cross-bars $l$ are secured and which slide in guides $l^6$ of a section of frame $A^2$ secured to the main frame. Longitudinally extending shafts $l^7$ and $l^8$ journaled in frame $l^6$ have gears $l^9$ engaging rack bars $l^5$ and are geared together for conjoint operation by a cross-shaft $l^{10}$, gears $l^{11}$ on said shaft and a gear $l^{12}$ on shaft $l^7$ and a gear $l^{13}$ on shaft $l^8$ (Fig. 17).

Intermittent movement is imparted to the gear-mechanism to lower frame L, after delivery of each row of cigars into said frame, by a gear $l^{14}$ (Figs. 17 and 18) which meshes with a gear $l^{114}$ on shaft $l^7$, a rack $l^{15}$ sliding in a guide $l^{16}$, a link $l^{17}$ pivoted at its upper end to said rack as at $l^{18}$, and a wrist-pin $l^{19}$ on a notched wheel $l^{20}$, to which the lower end of link $l^{17}$ is pivoted. Shaft $l^{21}$, to which wheel $l^{20}$ is secured, is secured to a member $m$ of a clutch M which comprises another member $m'$ which is continuously driven by a shaft $m^2$ which is driven by a gear $m^3$ meshing with a gear $m^4$ (Fig. 3) on main driveshaft 73. This clutch is controlled by the movement of carriage D to render it operative to drive the gear-mechanism for lowering the skeleton-frame L after each row of cigars has been transferred to said frame, and is controlled to stop said mechanism after said frame has been lowered a distance corresponding to the depth of a row. A clutch-lever $m^5$ pivoted at $m^6$, is adapted to shift clutch-member $m'$ into and out of engagement with member $m$, is spring-pressed to cause one end thereof to engage notched-wheel $l^{20}$, and is connected to an arm $m^7$ by a pin and slot $m^8$ (Fig. 13). Said arm is secured to a rock-shaft $m^9$, to the inner end of which, is secured an arm $m^{10}$ having a stud $m^{11}$, disposed in the path of a dog $m^{12}$ (Figs. 13 and 16) pivoted to the outer side of one of the plates $d$ of carriage D. During the in-stroke of said carriage, dog $m^{12}$ will strike and depress stud $m^{11}$ to rock arm $m^{10}$, shaft $m^9$ and arm $m^8$ and operate lever $m^5$ to bring the clutch-members together. Normally lever $m^5$ is in a notch $m^{13}$ in wheel $l^{20}$, and when said lever is operated by the carriage, said wheel will be driven to operate the gear-mechanism for the skeleton frame L until said lever can pass into the next notch $m^{14}$ in said wheel. These operations will be repeated each time carriage D is operated, until sufficient rows to fill the box have been delivered to frame L, there being as many notches in said wheel as there are rows of cigars in a box. Dog $m^{12}$ is pivoted so as to permit it to pass over stud $m^{11}$ on the out-stroke of the carriage.

A follower N is adapted to hold and press the cigars in the box while the skeleton frame L is withdrawn (Figs. 13, 14, 15, and 17ª), and comprises a plate $n$ disposed beneath the cross-bars $l$ of frame L so it will be lowered step-by-step with said frame. Extensions $n'$ which are adjustably connected to plate $n$ by bolts $n^2$ and slots $n^3$, adapt the follower for boxes of different sizes. A plunger $n^4$ secured to plate $n$ is guided by frame $A^2$ and has a rack meshing with a gear $n^5$. A convolute spring $n^6$ is connected to the shaft of gear $n^5$ to oppose downward movement of skeleton frame L and to lift after the frame when it has been lowered. A lock-pin $n^7$ (Figs. 14 and 15) is adapted to pass over plunger $n^4$ when the latter is in its lowermost position, to lock the follower against upward movement. Said pin is operated to release plunger $n^4$ so that the follower will be retracted by spring $n^6$, by a lever $n^8$ to which said pin is pivoted, and an abutment $n^9$ which is secured to side-plate $l'$ of the skeleton frame and strikes one end of said lever to withdraw lock-pin $n^7$ at the end of the upward movement of frame L. After sufficient rows of cigars to fill a box have been delivered to the skeleton frame L, clutch-lever $m^5$ will ride on the periphery of wheel $l^{20}$ from the time said lever is released from the last notch $m^{20}$ of the series in said wheel, until it passes into the first notch $m^{13}$, and during this period, frame L will be lowered to the bottom of the cigar-box for the last step of its lowering movement (Fig. 14) and will then be retracted to its normal position (Fig. 13) without remaining in its lowest position. The follower N will be locked in its lowest position by pin $n^7$ to hold the cigars in the box while the frame L is being raised, and so pivoted bottom strips $l^3$ will be swung into parallel relation with side-plates $l$ and pass out of the box between the cigar-ends and the sides of the box. After said frame has been withdrawn from the cigar-box, abutment $n^9$ will operate lever $n^8$ and lock-pin $n^7$ to release the follower N whereupon the latter will be restored to its normal position by spring $n^6$. Wheel $l^{20}$ makes one complete revolution for each box of cigars.

Having thus described the invention, what I claim as new and desire to secure by Letters Patent, is:

1. In a cigar-banding machine, the combination of a pair of band-applying elements disposed laterally of each other so they may simultaneously engage and hold wide and narrow portions of a band which has one of its ends wider than the other, around a cigar, and mechanism for operating one of said elements to first apply and hold the wide end of a band around the cigar and for operating the other element to lap the narrow end over and hold it around the wide end, while the wide end is being held around the cigar by the element which has applied it.

2. In a cigar-banding machine, the combination of a pair of band-applying elements disposed laterally of each other so they may simultaneously engage and hold wide and narrow portions of a band which has one of its ends wider than the other, around a cigar, and mechanism for operating one of said elements to first apply and hold the wide end of a band around the cigar and for operating the other element to lap the narrow end over and hold it around the wide end while the wide end is being held around the cigar by the element which has applied it, one of said elements being flexible.

3. In a cigar banding machine, the combination of a pair of flexible band-applying elements disposed laterally of each other so they may simultaneously engage and hold wide and narrow portions of a band which has one of its ends wider than the other around a cigar, and mechanism for operating one of said elements to first apply and hold the wide end of a band around the cigar and for operating the other element to lap the narrow end over and hold it around the wide end while the wide end is being held around the cigar by the element which has applied it.

4. In a cigar-banding machine, the combination of a pair of band-applying elements disposed to engage the side portions of one end of a band which has one end wider than the other, a band-applying element disposed to operate between the elements of said pair and disposed to engage the other end of the band, and mechanism for operating said elements to cause them to simultaneously engage and overlap the ends of the band.

5. In a cigar-banding machine, the combination of a pair of band-applying elements for engaging the side portions of one end of a band which has one end wider than the other, a band-applying element disposed to operate between the elements of said pair and for engaging the other end of the band, and mechanism for operating said elements to cause said pair of elements to hold the wide end of the band while the other element folds the narrow end to overlie the wide end, and to thereafter cause said elements to hold both ends.

6. In a cigar-banding machine, the combination of a pair of flexible band-applying elements for engaging the side portions of one end of a band which has one end wider than the other, a band-applying element disposed to operate between the elements of said pair and for engaging the other end and band, and mechanism for operating said elements to cause said pair of elements to engage and hold the wide end of one end of the band while the other element folds the narrow end to overlie the wide end.

7. In a cigar-banding machine, the combination of a pair of flexible band-applying elements for engaging the side portions of one end of a band which has one end wider that the other, a flexible band-applying element disposed to operate between the elements of said pair and for engaging the other end of the band, and mechanism for operating said elements to cause said pair of elements to engage and hold the side portions of one end of the band while the other element folds the narrow end to overlie the wide end.

8. In a cigar-banding machine, the combination of a yielding cigar-support, a pair of band-applying elements for engaging the side portions of one end of a band, which has one end wider than the other, a band-applying element disposed to operate between the elements of said pair and for engaging the other end of the band, and mechanism for operating said elements to cause them to simultaneously engage and overlap the ends of the band, said support being disposed within said elements.

9. In a cigar-banding machine, the combination of a carrier, mechanism for operating the carrier, a yielding support on the carrier, band-applying elements mounted on the carrier and movable relatively thereto, one of said elements being disposed to engage the side portion of a band which has one of its ends narrower than the other, the other of said elements being disposed to engage the narrow end of the band, and mechanism for operating said elements to cause the element engaging the wide portion of the band to hold it in contact with the cigar while the other element is operated to fold the narrow end of the band thereover during the operation of the carrier, said support being disposed within said elements.

10. In a cigar banding machine, the combination of a yielding support for a cigar, mechanism for delivering a cigar onto said support, band-applying elements surrounding the support and mechanism for operating said elements to wrap the band around the cigar on said support, said elements being movable and operated relatively to said support to apply the band without rotating the cigar on the support.

11. In a cigar banding machine, the combination of a yielding support for a cigar, mechanism for delivering a cigar onto said support, flexible band-applying elements surrounding the support, and mechanism for operating said elements to wrap the band around the cigar on the support without rotating the cigar relative to said support.

12. In a cigar-banding machine, the combination of a yielding support for a cigar, mechanism for delivering a cigar onto said support, flexible band-applying elements surrounding the support, and arms for operating said elements to wrap the band around the cigar on the support without rotating the cigar relative to said support.

13. In a cigar-banding machine, the combination of a resilient support for a cigar, mechanism for delivering a cigar onto said support, band-applying elements surrounding the support and mechanism for operating said elements to wrap a band around the cigar on the support, said elements being movable and operated relatively to said support to apply the band without rotating the cigar on the support.

14. In a cigar-banding machine, the combination of a rotatable carrier, a series of banding devices on the carrier and movable relatively thereto, each comprising a yielding support for a cigar, band-applying elements, mechanism for operating the carrier, and mechanism for operating said elements to wrap a band around the cigar on the support without rotatating the cigar relative to said support during the rotation of the carrier.

15. In a cigar-banding machine, the combination of a rotatable carrier, a series of banding devices on the carrier and movable relatively thereto, each comprising a yielding support, flexible band-applying elements, mechanism for operating said elements to wrap a band around the cigar on the support without rotating the cigar relative to said support during the rotation of the carrier.

16. In a cigar-banding machine, the combination of a rotatable carrier, a series of banding-devices on the carrier and movable relatively thereto, each comprising a yielding support, flexible band-applying elements, mechanism for operating the carrier and arms for operating said elements to wrap a band around the cigar without rotating the cigar relative to said support during the rotation of the carrier.

17. In a cigar-banding machine, the combination of a rotatable carrier, a series of banding devices on the carrier and movable relatively thereto, each comprising a yielding support, band-applying elements mechanism for operating the carrier, and yielding arms for operating said elements to wrap a band around the cigar without rotating the cigar relative to said support during the rotation of the carrier.

18. In a cigar-banding machine, the combination of a yielding cigar-support extending lengthwise of the cigar, band-applying elements surrounding the support and coöperating therewith to wrap a band around a cigar on the support, and mechanism for operating said elements without rotating the cigar relative to said support.

19. In a cigar-banding machine, the combination of a cigar-support extending lengthwise of the cigar, means for sustaining the support so it may yield at either end, band-applying elements surrounding the support and coöperating therewith to wrap a band around a cigar on the support, and mechanism for operating said elements without rotating the cigar relative to said support.

20. In a cigar-banding machine, the combination of a yielding cigar-support extending lengthwise of the cigar, flexible band-applying elements surrounding the support and coöperating therewith to wrap a band around the cigar on the support, connected to said support and mechanism for operating said elements without rotating the cigar relative to said support.

21. In a cigar-banding machine, the combination of a cigar-support extending lengthwise of the cigar, yielding arms on said support, band-applying elements surrounding the support and coöperating therewith to wrap a band around the cigar on the support, and mechanism for operating said elements without rotating the cigar relative to said support.

22. In a cigar-banding machine, the combination of a rotatable carrier, a series of banding devices on the carrier and movable relatively thereto, each comprising a supporting strip extending lengthwise of the cigar, means at the ends of said strip for resiliently supporting it and banding elements for wrapping a band around a cigar on the support, and mechanism for operating said elements without rotating the cigar relative to said support during the rotation of the carrier.

23. In a cigar-banding machine, the combination of a rotatable carrier, a series of devices on the carrier and movable relatively thereto, each comprising a supporting-strip extending lengthwise of the cigar, means at the ends of said strip for resiliently supporting it, and flexible band-applying elements for wrapping a band around a cigar on the support, and mechanism for operating said elements without rotating the cigar relative to said support during the rotation of the carrier.

24. In a cigar-banding machine, the combination of a rotatable carrier, a series of devices on the carrier and movable relatively thereto, each comprising a supporting strip extending lengthwise of the cigar, means at the ends of said strip for resiliently supporting it, flexible band-applying elements for wrapping a band around a cigar on the support, and arms for operating said elements, and mechanism for operating said carrier without rotating the cigar relative to said support during the rotation of the carrier.

25. In a cigar banding machine, the combination of a band applying element disposed to engage one end of a band, a band applying element disposed to engage the other end of the band, and mechanism for operating the elements simultaneously to overlap the ends of the band, one of said elements being disposed to operate laterally of the other.

26. In a band applying element, the combination of a flexible band applying element disposed to engage one end of a band, a flexible band applying element disposed to engage the other end of the band, and mechanism for operating the elements simultaneously to overlap the ends of the band, one of said elements disposed to operate laterally of the other.

27. In a cigar-banding machine, the combination of a cigar-support, flexible banding elements for wrapping a band around a cigar on the support, movable relatively to the support to apply a band without shifting the cigar on the support, and yielding means for operating said elements to wrap a band around a cigar while the cigar remains in fixed relation to the support.

28. In a cigar banding machine, the combination of a rotary band applying element disposed to engage one end of a band, a rotary band applying element disposed to engage the other end of the band, and mechanism for rotating the elements simultaneously to overlap the end of the band, one of said elements being disposed to rotate laterally of the other.

29. In a cigar-banding machine, the combination of a support for a cigar, flexible band-applying elements having one end fixed, yielding arms for operating said elements to wrap a band around a cigar, and mechanism for operating said arms.

30. In a cigar-banding machine, the combination of a rotatable series of devices each comprising a support for a cigar, flexible elements having one end fixed, yielding arms for operating said elements to wrap a band around a cigar, mechanism for operating said arms, and mechanism for rotating said devices.

31. In a cigar-banding machine, the combination of a support for a cigar, flexible band-applying elements having one end fixed, yielding arms for operating said elements to wrap a band around a cigar, a tension-device connected to the other end of said element, and mechanism for operating said arms.

32. In a cigar-banding machine, the combination of a support for a cigar, flexible band-applying elements having one end fixed, yielding arms for operating said elements to wrap a band around a cigar, rollers on the arms engaging said elements, and mechanism for operating said arms.

33. In a cigar-banding machine, the combination of support for a cigar, flexible banding-elements, each having one of its ends substantially fixed, spring-tension devices connected to the other ends of said elements, said elements being movable relatively to the support, means for operating said flexible elements to wrap a band around the cigar, and mechanism for operating said means without rotating the cigar relative to said support.

34. In a cigar-banding machine, the combination of a series of rotatable devices, each comprising a support for a cigar, flexible banding-elements, each having one of its ends substantially fixed, a spring-tension device connected to the other end, said elements being movable relatively to the support, means for operating said flexible elements to wrap a band around the cigar without rotating the cigar relative to said support, and mechanism for operating said means, and mechanism for rotating said devices.

35. In a cigar-banding machine, the combination of a support for a cigar, flexible banding-elements, each having one of its ends fixed to said support, a spring take-up device connected to the other end, said elements being movable relatively to the support, means for operating said flexible elements to wrap a band around the cigar without rotating the cigar relative to said support, and mechanism for operating said means.

36. In a cigar-banding machine, the combination of a support for a cigar, flexible banding-elements, each having one of its ends fixed to said support, a spring-tension device connected to the other end, said elements being movable relatively to the support, yielding means for operating said flexible elements to wrap a band around the cigar without rotating the cigar relative to said support, and mechanism for operating said means.

37. In a cigar-banding machine, the combination of a rotatable carrier, a series of band-applying devices sustained in and movable relatively to the carrier, each of said devices comprising elements for wrapping the ends of a band around a cigar, mechanism for operating said elements in the carrier to lap one end of the band over the other and to simultaneously hold both ends around the cigar without rotating the cigar in the carrier and mechanism for rotating the carrier, the band-applying devices being operated by rotation of the carrier.

38. In a cigar-banding machine, the combination of a rotatable carrier, a series of devices mounted in the carrier and movable relatively thereto, each comprising a pair of flexible elements for wrapping the ends of a band around a cigar, mechanism for successively operating said elements in the carrier to lap one end of the band over the other and to simultaneously hold the ends around the cigar, and mechanism for rotating the carrier, said devices being operated by the rotation of the carrier.

39. In a cigar-banding machine, the combination of a rotatable carrier, a series of devices mounted in the carrier and movable relatively thereto, each comprising a pair of flexible elements for wrapping a band around a cigar, mechanism for successively operating said elements to lap one end of the band over the other and to simultaneously hold the ends around the cigar, mechanism for rotating the carrier, and means for holding said elements applied to the band during a portion of each revolution of the carrier, said devices being operated by the rotation of the carrier.

40. In a cigar-banding machine, the combination of a series of devices, each comprising a yielding support for a cigar and arms for wrapping the ends of a band around a cigar on the support, a plunger for forcing cigars onto the supports, mechanism for operating said plunger and means for successively bringing said devices into position to receive a cigar from the plunger, a yielding connection between said mechanism and said plunger.

41. In a cigar-banding machine, the combination of a series of devices, each comprising a yielding support for a cigar and arms for wrapping the end of a band around a cigar, on the support, a plunger for forcing cigars onto the supports, mechanism for operating said plunger, a yielding connection between said mechanism and said plunger, means for intermittently feeding bands between the plunger and the support and means for successively bringing said devices into position to receive a cigar from the plunger.

42. In a cigar-banding machine, the combination of a yielding support for a cigar, a plunger for delivering a cigar onto the support, mechanism for operating the plunger, banding-elements, and means for operating one of the banding elements to fold one end of the band around a cigar while the latter is held on the support by the plunger.

43. In a cigar-banding machine, the combination of a support for a cigar, a plunger for delivering a cigar onto the support, mechanism for operating the plunger, banding elements, and means for operating one of the banding elements to fold one end of the band around a cigar while the latter is held on the support by the plunger, and to hold the cigar after the plunger releases the cigar.

44. In a cigar-banding machine, the combination of a yielding support for a cigar, a plunger for delivering a cigar onto the support, mechanism for operating the plunger, banding elements, and means for operating one of the banding elements to fold one end of the band around a cigar while the latter is held on the support by the plunger and to hold the cigar after the plunger releases the cigar.

45. In a cigar-banding machine, the combination of a yielding support for a cigar, a plunger for delivering a cigar onto the support, mechanism for operating the plunger, banding elements, means for operating one of the banding elements to fold one end of the band around the cigar while the latter is held on the support by the plunger, and means for operating the other element to fold the other end of the band around the cigar after the plunger has released the cigar.

46. In a cigar-banding machine, the combination of a yielding support for a cigar, a plunger for delivering a cigar onto the support, mechanism for operating the plunger, a carrier, banding elements mounted on the carrier, means for operating one of the banding elements to fold one end of the band around the cigar while the latter is held on the support by the plunger, means operated by rotation of the carrier to operate the other element to fold the other end of the band around the cigar after the plunger has released the cigar, and mechanism for rotating the carrier.

47. In a cigar-banding machine, the combination of a rotatable carrier, a series of devices mounted in the carrier and movable relatively thereto, a plunger for delivering cigars to said devices, each of said devices comprising a yielding cigar-support, and band-applying elements, means for operating one of said elements to lay one end of the band around the cigar before the plunger has released the cigar, mechanism for rotating the carrier and for operating the other band-applying element, and mechanism for operating the plunger.

48. In a cigar-banding machine, the combination of a rotatable carrier, a series of devices mounted in the carrier and movable relatively thereto, a yielding plunger for delivering the cigars to said devices, each of said devices comprising a yielding cigar-support and band-applying elements, means for operating one of said elements to lay one end of the band around the cigar on the support before the plunger has released the cigar, mechanism for operating the carrier and for operating the other band-applying element, and mechanism for rotating the plunger.

49. In a cigar-banding machine, the combination of a cigar-support extending lengthwise of the cigar and supported at its ends, a pair of band-applying elements supported to rotate around the axis of the cigar held on the support, each element having a part extending lengthwise of the cigar, sustained at its ends to rotate around a cigar and mechanism for rotating said elements.

50. In a cigar-banding machine, the combination of a yielding cigar-support extending lengthwise of the cigar and supported at its ends, a pair of band-applying elements supported to rotate around the axis of the cigar held on the support, each element having a part extending lengthwise of the cigar, sustained at its ends to rotate around a cigar and mechanism for successively rotating said elements.

51. In a cigar-banding machine, the combination of a cigar-support extending lengthwise of the cigar and slidably sustained at its ends, a pair of band-applying elements supported to rotate around the axis of the cigar held on the support, said elements having a part extending lengthwise of the cigar, sustained at its ends to rotate around a cigar, and mechanism for rotating said elements.

52. In a cigar-banding machine, the combination of a yieldable cigar-support extending lengthwise of the cigar and slidably supported at its ends, a pair of band-applying elements supported to rotate around the axis of the cigar held on the support, said elements having a part extending lengthwise of the cigar and sustained at its ends to rotate around the cigar, and mechanism for rotating said elements.

53. In a cigar-banding machine, the combination of a cigar-support extending lengthwise of the cigar, a pair of banding elements, each having a part extending lengthwise of the cigar and journaled at the ends thereof to rotate about the axis of the cigar, arms on said elements respectively, and means for successively rotating said elements to fold the ends of the band around the cigar.

54. In a cigar-banding machine, the combination of a yielding cigar-support extending lengthwise of the cigar, a pair of banding-elements having a part extending lengthwise of the cigar and journaled at the ends thereof to rotate about the axis of the cigar, arms on said elements respectively, and means for successively rotating said elements to fold the ends of the band around the cigar.

55. In a cigar-banding machine, the combination of a cigar-support extending lengthwise of the cigar, a pair of banding-elements each having a part extending lengthwise of the cigar and journaled at the ends thereof to rotate about the axis of the cigar, yielding arms on said elements respectively, and means for successively rotating said elements to fold the ends of the band around the cigar.

56. In a cigar-banding machine, the combination of a yielding cigar support extending lengthwise of the cigar, a pair of banding elements having a part extending lengthwise of the cigar and journaled at the ends thereof to rotate about the axis of the cigar, yielding arms on said elements respectively, and means for successively rotating said elements to fold the ends of the band around the cigar.

57. In a cigar-banding machine, the combination of a cigar-support, a plunger for delivering the cigars onto the support, a pair of band-applying elements disposed to rotate around the axis of the cigar, each comprising a strip extending lengthwise of the cigar, an arm and a roller on said arm, means at the ends of said strips for rotatably supporting the elements, and mechanism for successively operating said elements.

58. In a cigar-banding machine, the combination of a cigar-support, a yielding plunger for delivering the cigars onto the support, a pair of band-applying elements disposed to rotate around the axis of the cigar, each comprising a strip extending lengthwise of the cigar, an arm and a roller on said arm, means at the ends of said strips for rotatably supporting the elements, and mechanism for successively operating said elements.

59. In a cigar-banding machine, the combination of a yielding cigar-support, a plunger for delivering the cigars onto the support, a pair of band-applying elements disposed to rotate around the axis of the cigar, each comprising a strip extending lengthwise of the cigar, an arm and a roller on said arm, means at the ends of said strips for rotatably supporting the elements, and mechanism for successively operating said elements.

60. In a cigar-banding machine, the combination of a yielding cigar-support, a plunger for delivering the cigars onto the support, a pair of band-applying elements disposed to rotate around the axis of the cigar, and each comprising a strip extending lengthwise of the cigar, a yielding arm and a roller on the arm, means at the ends of said strips for rotatably supporting the elements, and mechanism for successively operating said elements.

61. In a banding machine, the combination of a series of rotatable banding devices, mechanism for rotating said devices to successively bring the banded cigars therein into position to discharge them, a vertically movable device for receiving cigars from said devices, and mechanism for operating said vertically movable device to receive the cigars from said banding devices and to lower them out of the devices.

62. In a banding machine, the combination of a series of rotatable banding devices, mechanism for rotating said devices to successively bring the banded cigars therein into position to discharge them, a vertically movable device for receiving cigars from said devices, mechanism for operating said vertically movable devices to receive the cigars from said banding devices and to lower them out of the devices, and a reciprocating table onto which the cigars are delivered by said vertically movable device.

63. In a banding machine, the combination of a series of rotatable banding devices, mechanism for rotating said devices to successively bring the banded cigars therein into position to discharge them, a vertically reciprocating device for receiving cigars from said devices and mechanism for operating said receiving device to receive the cigars from said banding-devices and to lower them out of the devices.

64. In a banding machine, the combination of a series of rotatable banding-devices, means for holding said devices in position to hold the bands around the cigars therein, mechanism for rotating said devices to bring them into position to discharge the cigars, a vertically movable device for receiving cigars from said banding devices, mechanism for operating said receiving device to lower the cigars out of said devices, and means for releasing the banding-devices operated with said receiving device.

65. In a banding-machine, the combination of a series of rotatable banding devices, means for holding said devices in position to hold the bands around the cigars therein, mechanism for rotating said devices to bring them into position to discharge the cigars, a vertically movable device for receiving cigars from said banding devices, mechanism for operating said vertically movable devices to lower the cigars out of said banding-devices, means for releasing the banding devices operated by said receiving device, and a reciprocating table onto which the cigars are delivered by said receiving device.

66. In a banding machine, the combination of a series of rotatable banding devices, means for holding said devices in position to hold the bands around the cigars therein, mechanism for rotating said devices to bring them into position to discharge the cigars, a vertically slidable device for receiving cigars from said devices, mechanism for operating said receiving device to lower the cigars out of said banding devices, and means for releasing the banding-devices operated with said devices.

67. In a banding machine, the combination of web-feeding mechanism, comprising a pair of endless belts, mechanism for driving one of said belts, comprising a one-way clutch, means for adjusting the stroke of the clutch to vary the web-feed, cutting mechanism for the web, and banding-mechanism to which the severed bands are delivered.

68. In a banding machine, the combination of web-feeding mechanism, comprising a pair of endless belts mechanism for driving one of said belts comprising a one-way clutch and a cam, means for adjusting the stroke of the clutch to vary the feed of the web, cutting-mechanism for the web, and banding mechanism to which the severed bands are delivered.

69. In a banding machine, the combination of web-feeding mechanism, comprising a pair of endless belts, mechanism for driving one of said belts comprising a one-way clutch, an arm, a cam, and means for adjusting the stroke of the clutch to vary the web-feed, cutting mechanism for the web, and banding-mechanism to which the severed bands are delivered.

70. In a cigar-banding machine, the combination of web-feeding mechanism, a plurality of cutters for cutting the web at different points to form bands of the different lengths, and cigar-banding mechanism to which the severed bands are delivered.

71. In a cigar-banding machine, the combination of web-feeding mechanism, a plurality of cutters for cutting the web at different points to form bands of different lengths, means whereby one of the cutters may be rendered inoperative, and a banding-device to which the severed bands are delivered.

72. In a cigar-banding machine, the combination of web-feeding mechanism, a plurality of cutters for cutting the web at different points to form bands of the different lengths, cigar-banding mechanism to which the severed bands are delivered, a plunger for delivering cigars to said device and means for conjointly operating the cutter and plunger.

73. In a cigar-banding machine, the combination of web-feeding mechanism, a plurality of cutters for cutting the web at different points to form bands of different lengths, means whereby one of the cutters may be rendered inoperative, and a banding-device to which the severed bands are delivered, and an agglutinant applying device and mechanism for conjointly operating the applying-device and the cutter.

74. In a banding-machine, the combination of a device for banding cigars, packing mechanism, mechanism for feeding rows of banded cigars to the packing mechanism, and means for automatically controlling the operation of the row-feeding mechanism to successively feed rows of different numbers to the packing mechanism.

75. In a banding-machine, the combination of a device for banding cigars, packing-mechanism, mechanism for feeding rows of banded cigars to the packing-mechanism, and means comprising a cam for automatically controlling the operation of the row-feeding mechanism to successively feed rows of different numbers to the packing-mechanism.

76. In a banding-machine, the combination of a device for banding cigars, packing-mechanism, mechanism for feeding rows of banded cigars to the packing-mechanism, and means for automatically controlling the operation of the row-feeding mechanism to successively feed rows of different numbers to the packing-mechanism, said automatic means including a cam, and a pawl and ratchet.

77. In a banding-machine, the combination of a device for banding cigars, packing-mechanism, mechanism for feeding rows of banded cigars to the packing-mechanism, and means for automatically controlling the operation of the row-feeding mechanism to successively feed rows of different numbers to the packing-mechanism, said automatic means including a pawl and ratchet, the pawl being disengageable from the ratchet to permit resetting.

78. In a banding-machine, the combination of banding-mechanism, packing-mechanism for the banded cigars, mechanism for feeding rows of cigars to the packing-mechanism, and means for feeding a strip of paper between the rows of cigars.

79. In a banding-machine, the combination of banding-mechanism, packing-mechanism for the banded cigars, mechanism for feeding rows of cigars to the packing-mechanism, and means for feeding a strip of paper between the rows of cigars, comprising a pneumatic gripper.

80. In a banding-machine, the combination of banding-mechanism, packing-mechanism for the banded cigars, mechanism for feeding rows of cigars to the packing-mechanism, and means for feeding a strip of paper between the rows of cigars, mounted on the row-feeding mechanism.

81. In a banding-machine, the combination of banding mechanism, packing-mechanism for the banded cigars, mechanism for feeding rows of cigars to the packing-mechanism, means for feeding a strip of paper between the rows of cigars comprising a pneumatic gripper, a vacuum chamber, and valve-mechanism controlled by the row-feeding mechanism.

82. In a cigar-banding machine, the combination of cigar-feeding mechanism, comprising a stationary support for cigars, a horizontally reciprocable and vertically movable carriage for advancing the cigars over the support, without rotating the cigars relative thereto, means for reciprocating the carriage and raising it to lift the cigars off the support before advancing them, and mechanism for banding the cigars.

83. In a cigar-banding machine, the combination of cigar-feeding mechanism, comprising a stationary support for cigars, a horizontally reciprocable and vertically movable carriage for advancing the cigars over the support, without rotating the cigars relative thereto, means for reciprocating the carriage and raising it to lift the cigars off the support before advancing them, and mechanism for banding the cigars, to which cigars are fed by said carriage.

84. In a cigar-banding machine, the combination of cigar-feeding mechanism, comprising a stationary support for the cigars, a horizontally reciprocable and vertically movable carriage for advancing the cigars over the support, without rotating the cigar relative thereto, means for reciprocating the carriage and raising it to lift the cigars off the support before advancing them, mechanism for banding the cigars, and mechanism for delivering banded cigars to said feeding-mechanism.

85. In a cigar-banding machine, the combination of cigar-feeding mechanism comprising a fixed table or support for the cigars, a horizontally reciprocable and vertically movable carriage for advancing the cigars over the support, without rotating the cigars relative thereto, means for reciprocating the carriage and raising it to lift the cigars off the support before advancing them, a series of rotatable devices for banding the cigars delivered thereto by said feed-mechanism, and feeding-mechanism for removing the banded cigars, comprising a horizontally reciprocable and vertically movable carriage.

86. In a cigar-banding machine, the combination of a banding device, driving-mechanism, mechanism for delivering cigars successively to said banding device, packing-mechanism to which the banded cigars are delivered and a throw-off for the driving-mechanism controlled by the delivery of the cigars to the banding-device.

87. In a cigar banding machine, the combination of a banding-device, mechanism for delivering cigars successively to said banding device, row-feeding mechanism for the banded cigars, driving-mechanism for the row-feed, and a throw-off for said driving-mechanism, controlled by the delivery of the cigars to the banding device.

88. In a cigar-banding machine, the combination of a banding-device, mechanism for delivering cigars successively to said banding device, and an automatic throw-off mechanism controlled by the delivery of the cigars to the banding device.

89. In a cigar-banding machine, the combination of a banding-device, mechanism for operating said device, mechanism for delivering cigars successively to said banding device, row-feeding mechanism for the banded cigars, controlled by the operation of the banding device, and a throw-off for said operating mechanism controlled by the delivery of the cigars to the banding device.

90. In a cigar-banding machine, the combination of banding-mechanism, mechanism for feeding rows of banded cigars, means for receiving the rows from the row-feed, and mechanism for lowering the receiving means step-by-step as each row is delivered until a sufficient number of rows have been packed to fill a box.

91. In a cigar-banding machine, the combination of banding-mechanism, cigar-packing mechanism comprising mechanism for feeding rows of banded cigars to the packing mechanism, and means for receiving the rows from the row-feed, and mechanism for lowering the receiving-means step-by-step as each row is delivered until a sufficient number of rows have been delivered to fill a box.

92. In a cigar-banding machine, the combination of banding-mechanism, mechanism for feeding rows of banded cigars, means for receiving the rows of cigars, a follower above the receiving-means, and mechanism for lowering the follower and receiving-means step-by step as each row is delivered until a sufficient number of rows have been received to fill a box.

93. In a cigar-banding machine, the combination of banding-mechanism, mechanism for feeding rows of banded cigars, means for receiving the rows from the row-feed, a follower above the cigars, mechanism for lowering the receiving means and plunger step-by-step as each row is delivered until sufficient number of rows have been received to fill a box, and means for operating the receiving means independently of the plunger after a box full of cigars has been delivered to the receiving means.

94. In a cigar-banding machine, the combination of banding-mechanism, a frame corresponding to a box to be filled, mechanism for feeding rows of banded cigars into said frame, mechanism for lowering the frame step-by-step as the rows are delivered thereinto, until the frame has received a sufficient number of rows to fill a box, and means for supporting a cigar-box below the frame.

95. In a cigar-banding machine, the combination of banding-mechanism, a frame corresponding to a box to be filled, mechanism for delivering rows of banded cigars into said frame, mechanism for lowering the frame step-by-step as the rows are delivered thereinto, until the frame has received a sufficient number of rows to fill a box, and means for supporting a cigar-box in position to receive the frame, said frame comprising foldable bottom strips.

96. In a cigar-banding machine, the combination of banding-mechanism, a frame corresponding to a box to be filled, mechanism for feeding rows of banded cigars into said frame, mechanism for lowering the frame step-by-step as the rows are delivered thereinto until the frame has been filled, means for supporting a cigar-box below the frame, and automatic mechanism for raising the frame into normal position after each box has been filled.

97. In a cigar-banding machine, the combination of banding-mechanism, a frame corresponding to a box to be filled, mechanism for feeding rows of banded cigars into said frame, mechanism, for operating the frame step-by-step as the rows are delivered into the frame until it has received a boxfull of cigars, a follower above said frame, mechanism for raising the frame while the follower holds the cigars, and means for holding a cigar-box so the frame will pass into it.

98. In a cigar-banding machine, the combination of a support adapted to receive the cigars, a series of rotatable banding devices, each adapted to receive and band a cigar, a plunger for feeding the cigars to said devices, means for feeding the cigars from said support into the path of the plunger by sidewise movement and without rotation of the cigars, the banding devices being adapted to hold the banded cigars therein until the devices are inverted in their rotation, a carriage for feeding the rows of banded cigars after they have been inverted, and means for packing the rows of cigars, whereby the cigars will be fed through the machine to the packing mechanism without being rolled.

99. In a cigar-banding machine, the combination of a support adapted to receive the cigars, a series of rotating banding devices, each adapted to receive and band a cigar, a plunger for feeding the cigars to said devices, means for feeding the cigars from said support into the path of the plunger by sidewise movement and without rotation of the cigars, the banding devices being adapted to hold the banded cigars therein until the devices are inverted in their rotation, means for receiving the inverted cigars from said devices and lowering them, a carriage for feeding the rows of banded cigars by sidewise movement, and means for packing the rows of cigars, whereby the cigars will be fed through the machine to the packing-mechanism without being rolled.

100. In a cigar-banding machine, the combination of a support adapted to receive the cigars, a series of rotatable banding-devices, each adapted to receive and band a cigar, a plunger for feeding the cigars to said devices, means for feeding the cigars from said support into the path of the plunger by sidewise movement and without rotation of the cigars, the banding devices being adapted to hold the banded cigars therein until the devices are inverted in their rotation, means for receiving the inverted cigars and lowering them from said devices, a support for the inverted lowered cigars, a carriage for feeding the rows of banded cigars from the latter support, by sidewise movement, and means for packing the rows of cigars, whereby the cigars will be fed through the machine to the packing mechanism without being rolled.

101. In a cigar-banding machine, the combination of a support adapted to receive the cigars, a series of rotatable banding devices, each adapted to receive and band a cigar, a plunger for feeding the cigars to said devices, means for feeding the cigars from said support into the path of the plunger by sidewise movement and without rotation of the cigars, the banding devices being adapted to hold the banded cigars therein until the devices are inverted in their rotation, a carriage for feeding the rows of banded cigars by sidewise movement of the cigars, means for causing the carriage to feed alternate rows of different numbers, and means for packing rows of cigars, whereby the cigars will be fed through the machine to the packing-mechanism without being rolled.

102. In a cigar-banding machine, the combination of banding-mechanism, row-feeding mechanism to which the banded cigars are delivered, comprising a carriage, mechanism for operating the banding mechanism, screws for reciprocating the carriage, and mechanism for intermittently operating the screws to feed the rows on the carriage.

103. In a cigar-banding machine, the combination of banding mechanism, row-feeding mechanism to which the banded cigars are delivered comprising a carriage, mechanism for operating the banding mechanism, screws for reciprocating the carriage, and mechanism for intermittently and alternately operating the screws to operate the carriage to feed the rows.

104. In a cigar-banding machine, the combination of banding-mechanism, row-feeding mechanism to which the banded cigars are delivered comprising a carriage, mechanism for operating the banding mechanism, screws for reciprocating the carriage, mechanism for intermittently operating the screws, and means for automatically controlling the screw-operating mechanism to alternately feed rows of different numbers.

105. In a cigar-banding machine, the combination of banding-mechanism, row-feeding mechanism to which the banded cigars are delivered comprising a carriage, mechanism for operating the banding mechanism, screws for reciprocating the carriage, mechanism for intermittently operating the screws, and mechanism for controlling the operation of the screw-operating mechanism, comprising a cam and a pawl and ratchet.

PAUL PIERSON.

Witnesses:
FRED GERLACH,
FRANKLIN H. WOBEOER.